(12) United States Patent
Takeuchi

(10) Patent No.: US 7,580,809 B2
(45) Date of Patent: Aug. 25, 2009

(54) DEVICE FOR DETECTING POSITIONS OF OBJECT

(75) Inventor: Yoshiharu Takeuchi, Kariya (JP)

(73) Assignee: Denso Corporation, Kariya, Aichi-Pref. (JP)

(*) Notice: Subject to any disclaimer, the term of this patent is extended or adjusted under 35 U.S.C. 154(b) by 278 days.

(21) Appl. No.: 11/315,121

(22) Filed: Dec. 23, 2005

(65) Prior Publication Data

US 2006/0149496 A1 Jul. 6, 2006

(30) Foreign Application Priority Data

Dec. 24, 2004 (JP) ............................. 2004-374361

(51) Int. Cl.
*G06F 19/00* (2006.01)
(52) U.S. Cl. ..................................... 702/153; 702/150
(58) Field of Classification Search ................... 73/314; 310/156.05; 324/207.11; 702/150, 151, 702/152
See application file for complete search history.

(56) References Cited

U.S. PATENT DOCUMENTS 5,650,779 A * 7/1997 Sugden .......................... 341/9

* cited by examiner

*Primary Examiner*—Edward R Cosimano
*Assistant Examiner*—Douglas N Washburn
(74) *Attorney, Agent, or Firm*—Nixon & Vanderhye PC

(57) ABSTRACT

A device for detecting a motional position of an object in motion uses a first unit and a second unit which are communicably linked with each other. The first unit repeatedly produces positional information indicative of the motional position of the object in response to a change in motional position of the object. The change in position is detected by a positional sensor placed to sense a movement of the object and reflects therein a motion of the object. The positional information is pulsed information. The first unit repeatedly transmits produced positional information every time when change in motional position of the object reaches a given unit quantity of change. The second unit repeatedly calculates motional position of the object based on a predetermined procedure including repeatedly counting a starting edge of positional information transmitted from the first unit.

25 Claims, 17 Drawing Sheets

FIG. 2
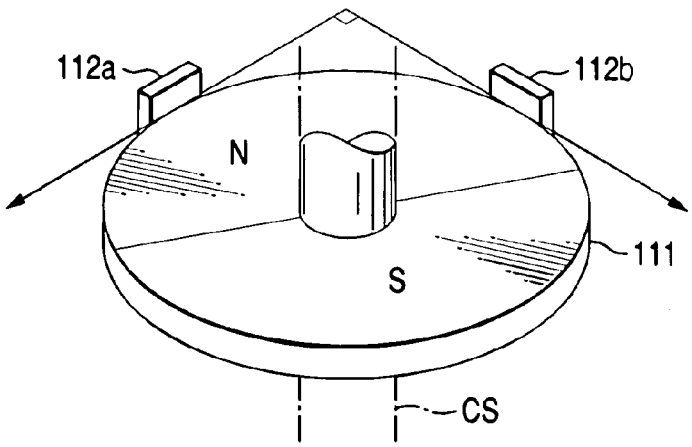
FIG. 3
*(PRIOR ART)*
(a)
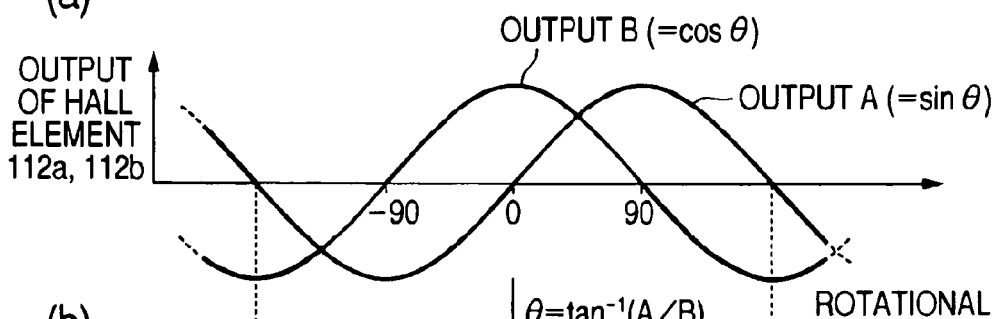
(b)
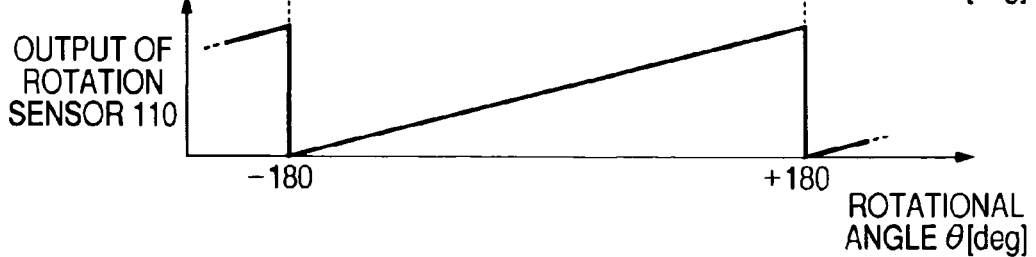
FIG. 4
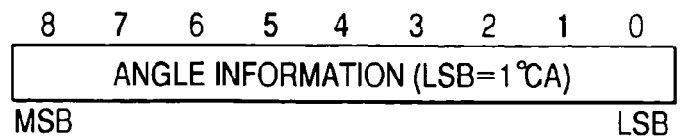

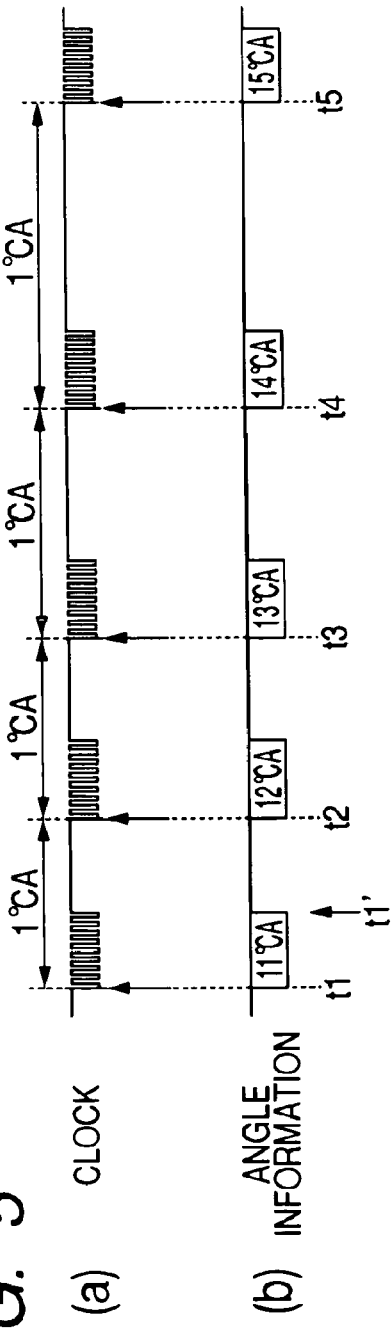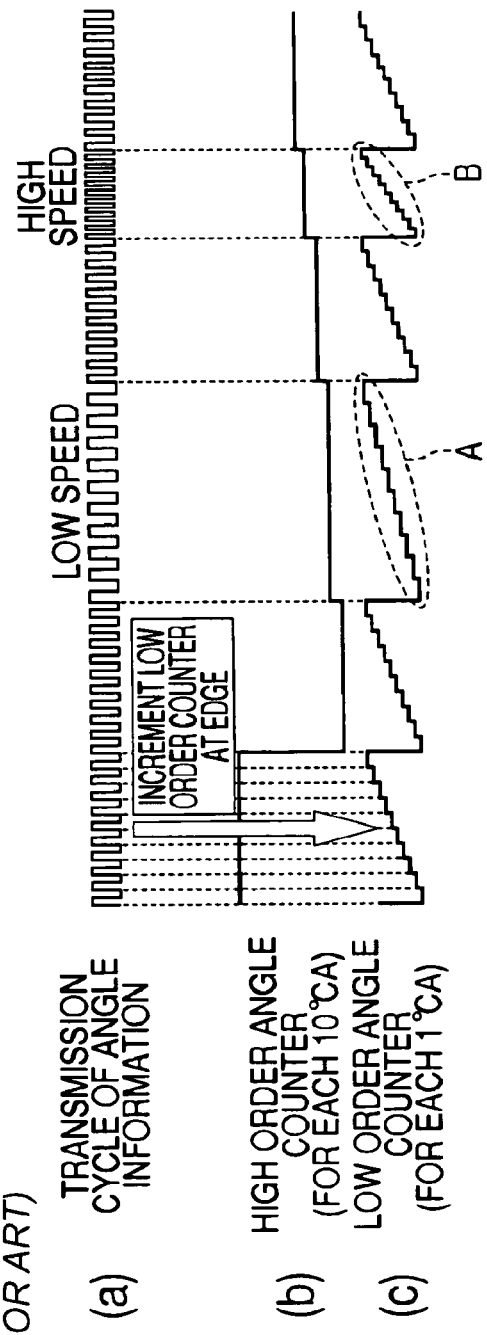

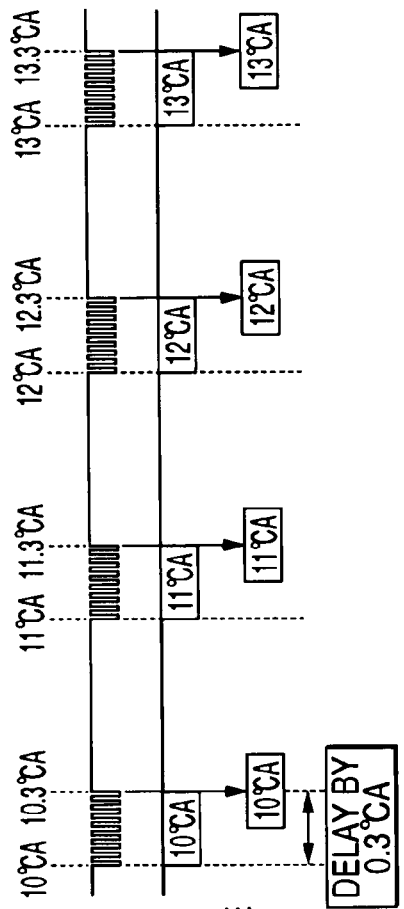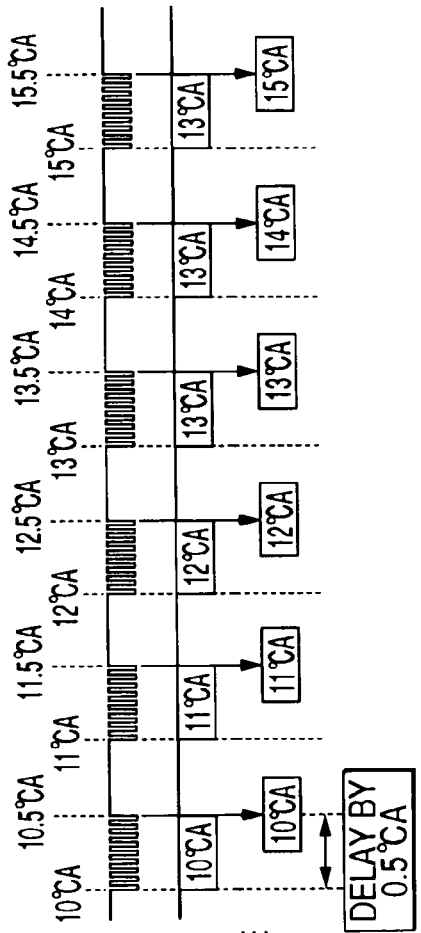
FIG. 7 (PRIOR ART)
FIG. 8 (PRIOR ART)

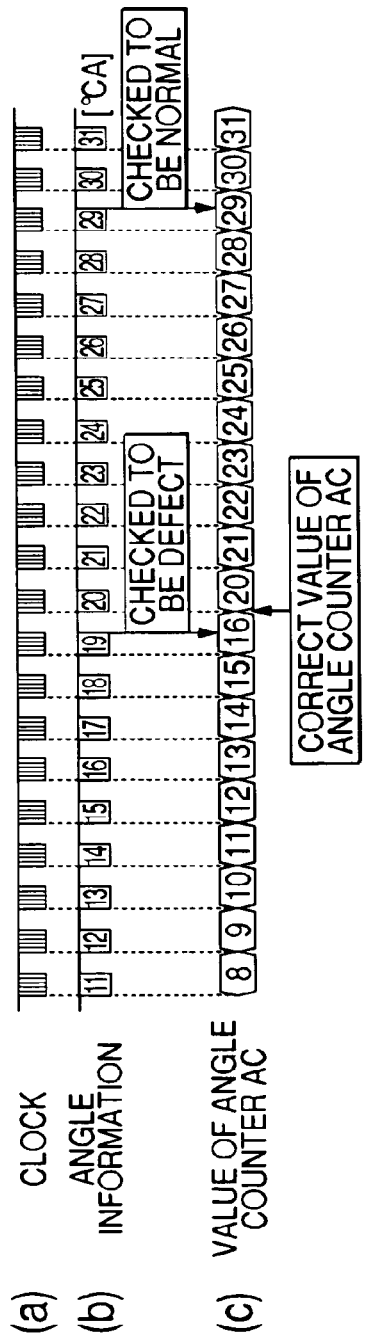
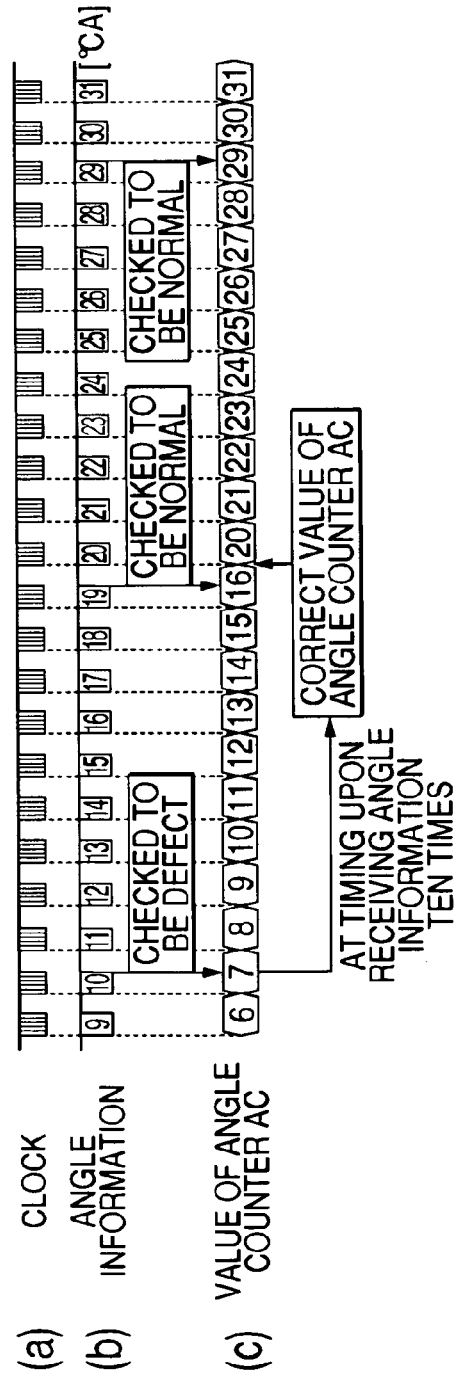

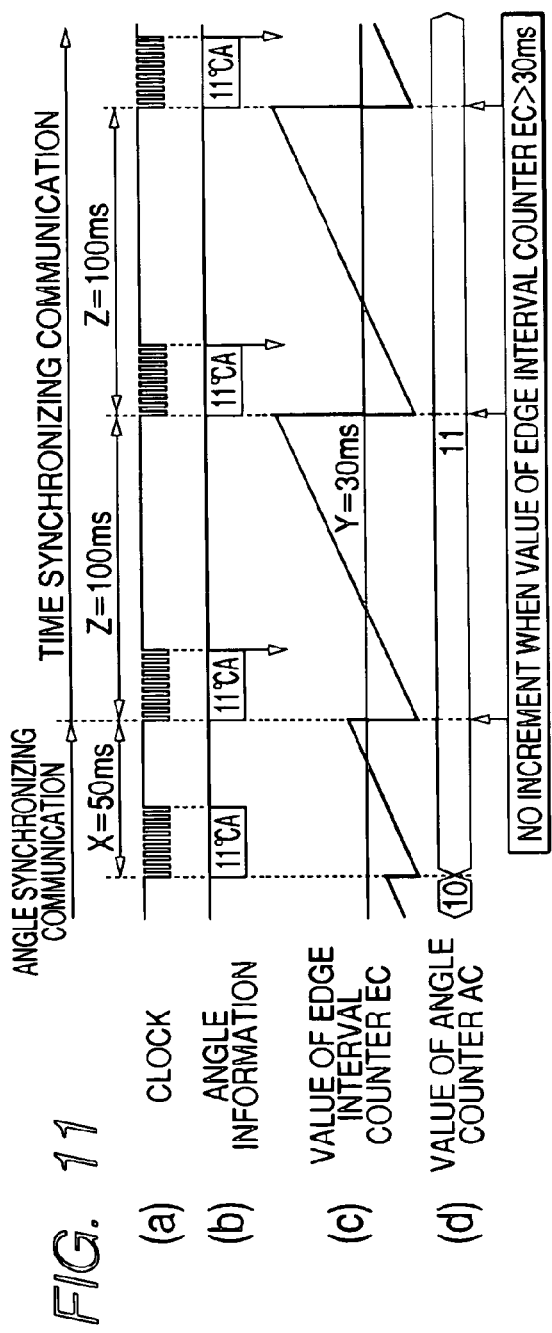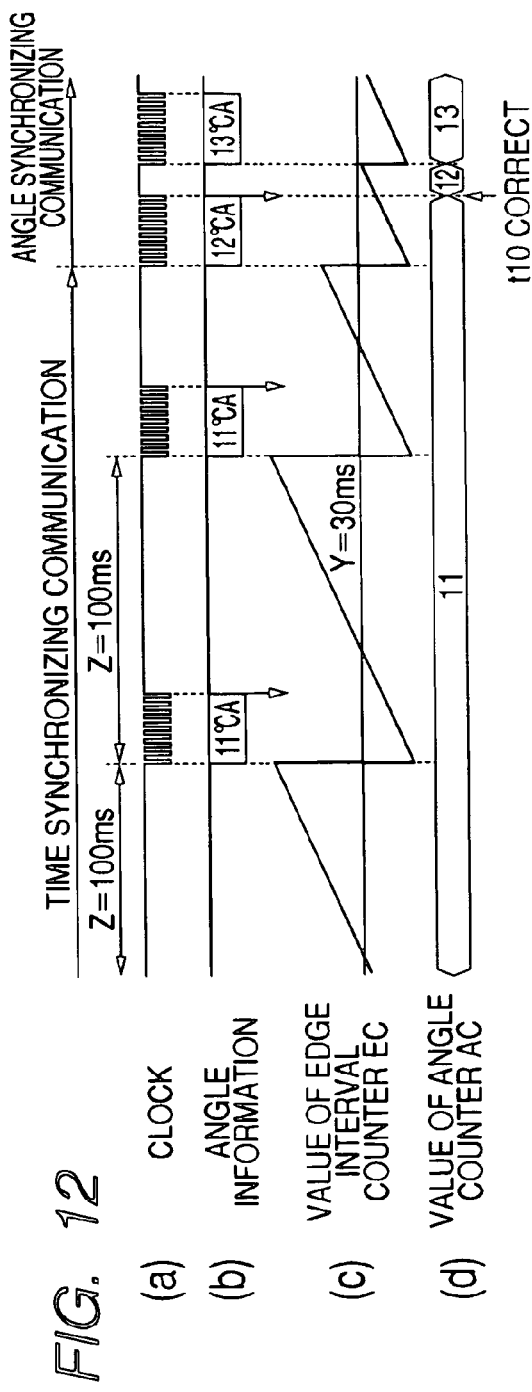

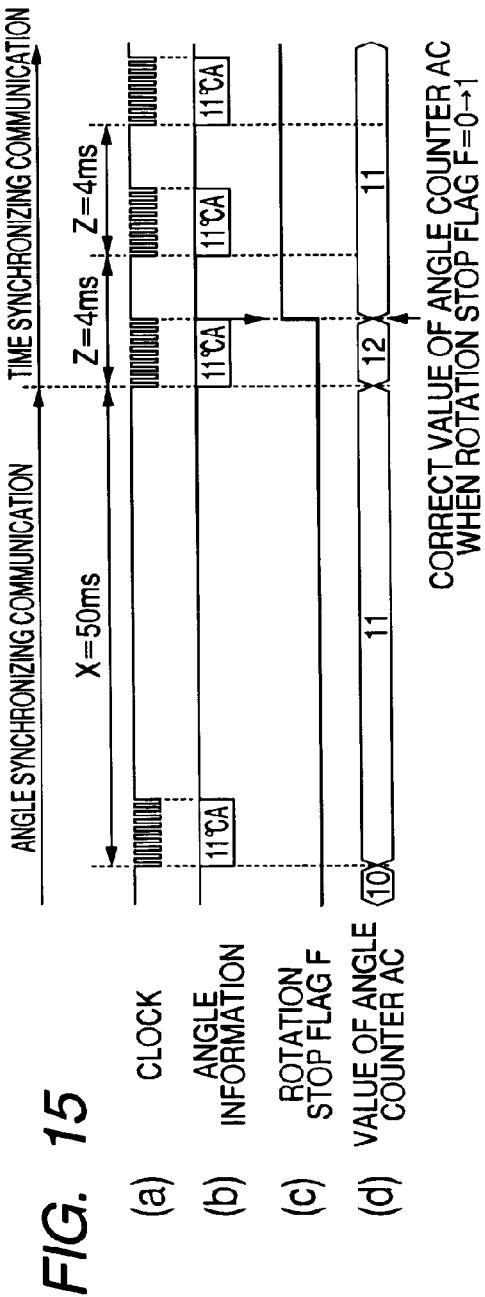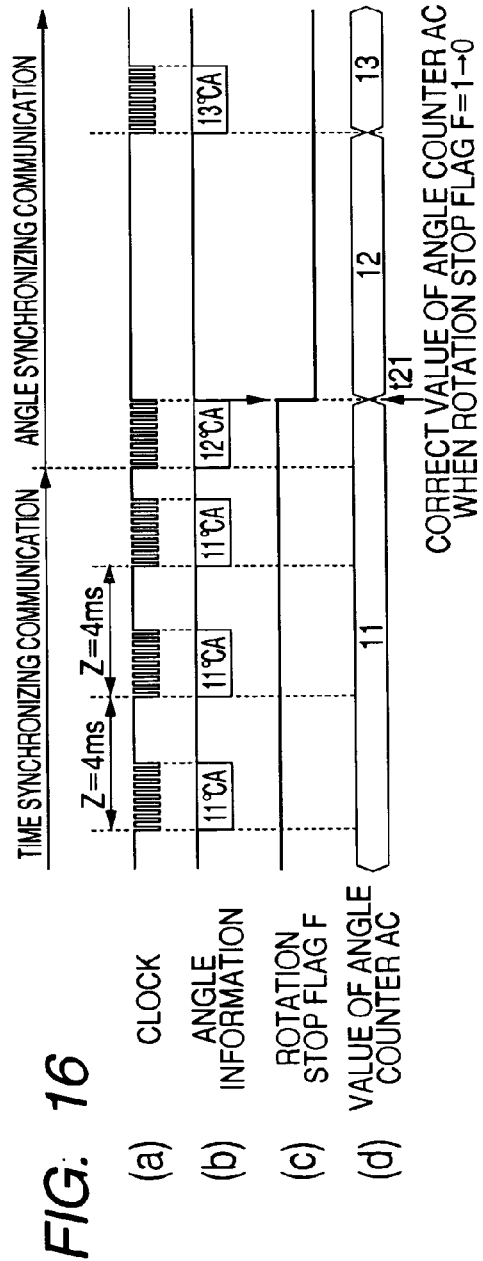

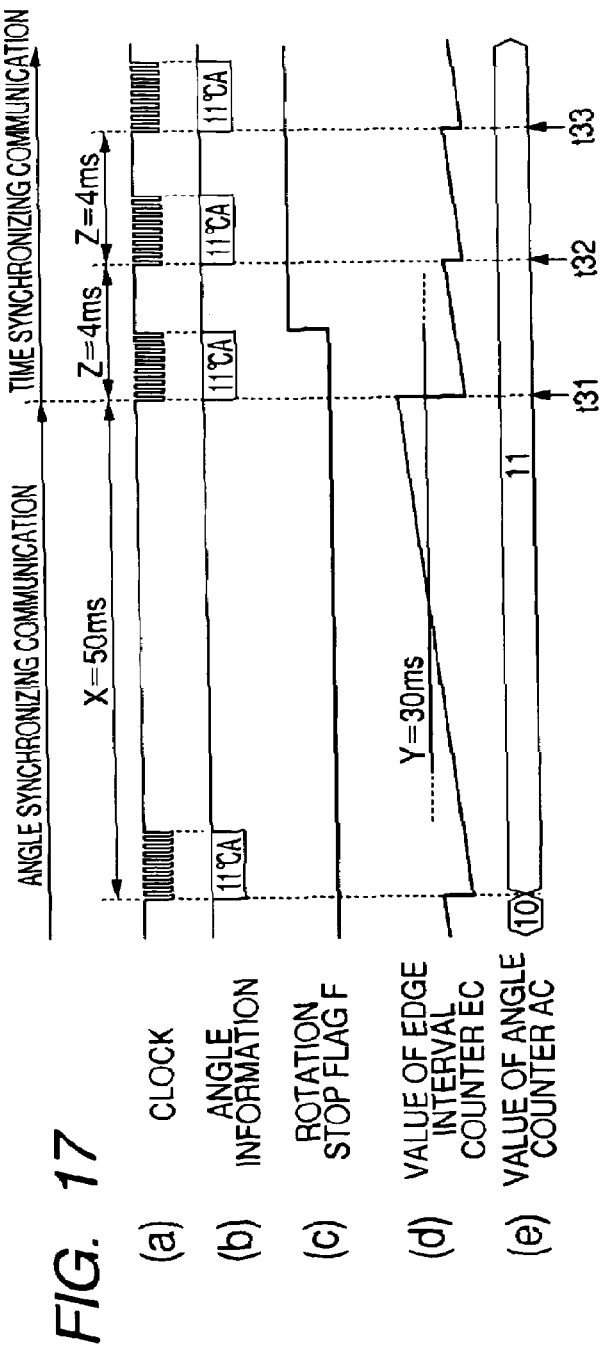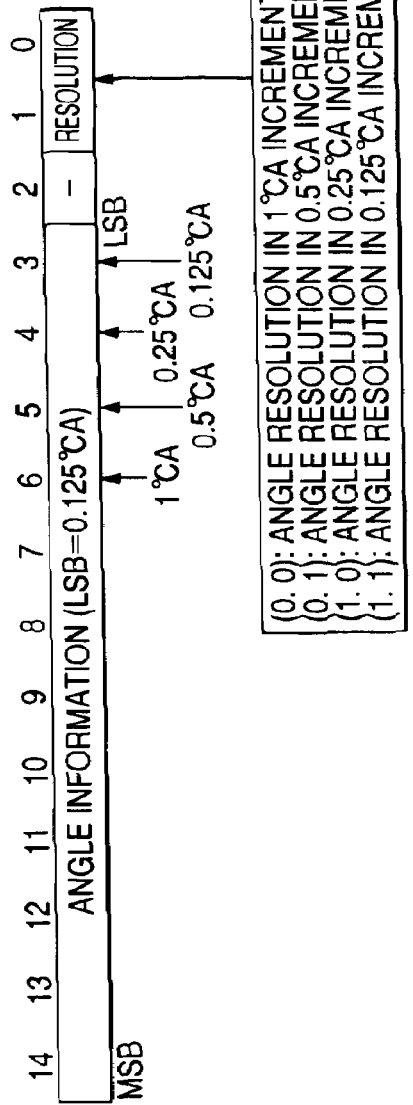
FIG. 17
FIG. 18

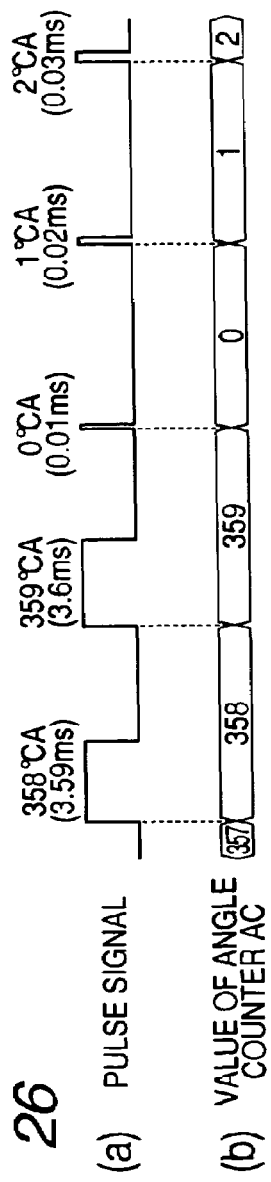
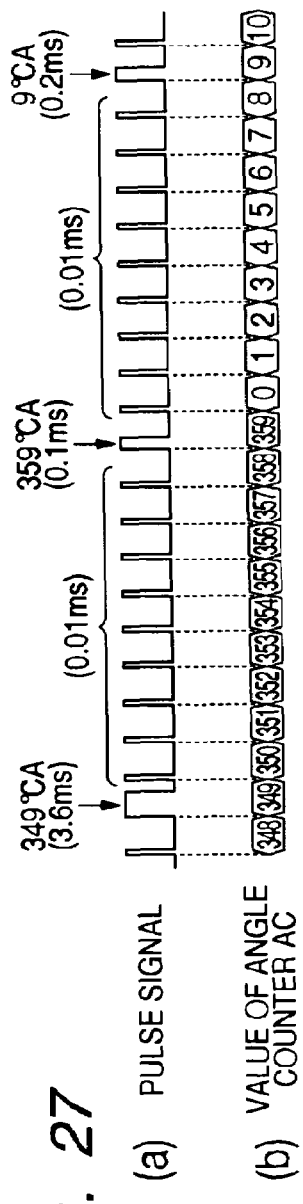
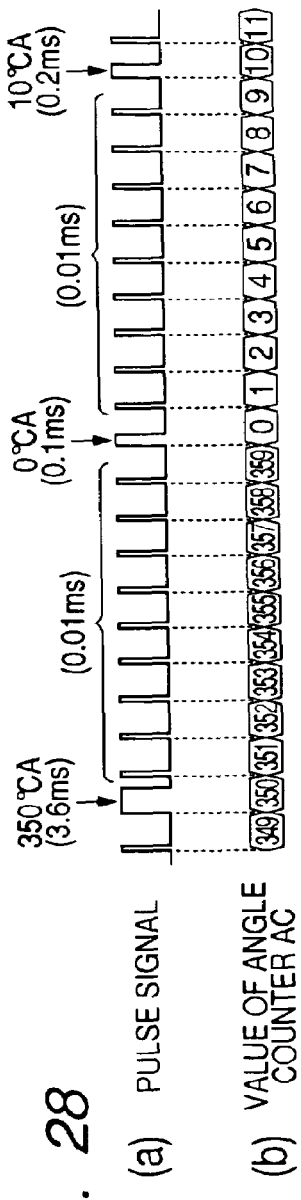
FIG. 26
FIG. 27
FIG. 28

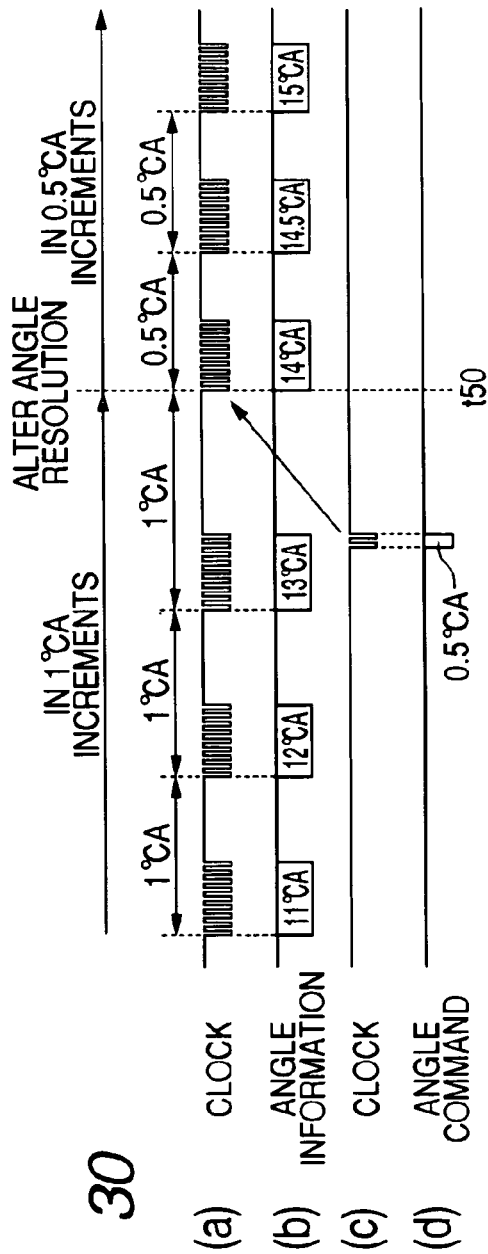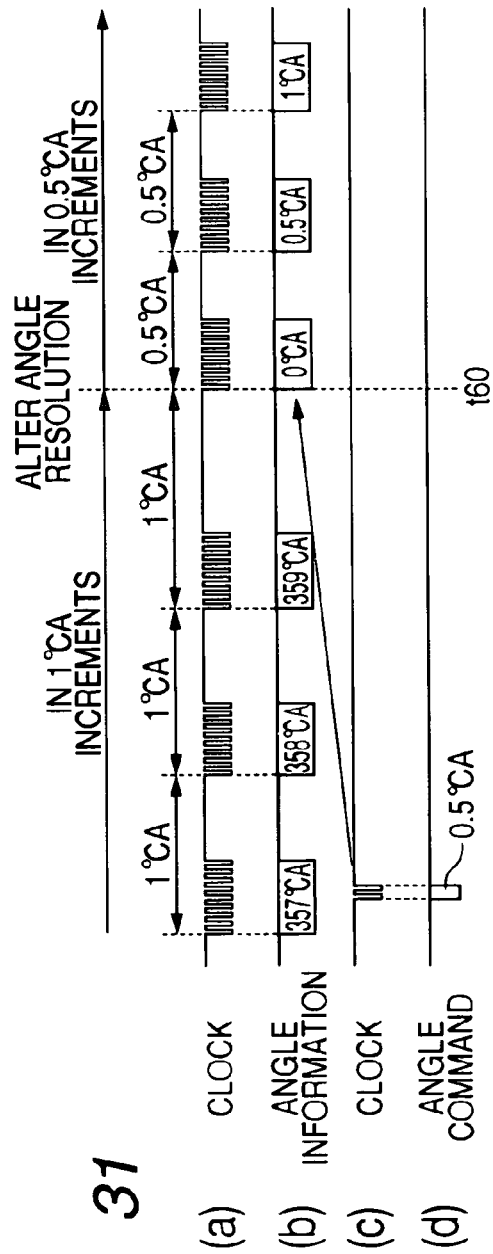

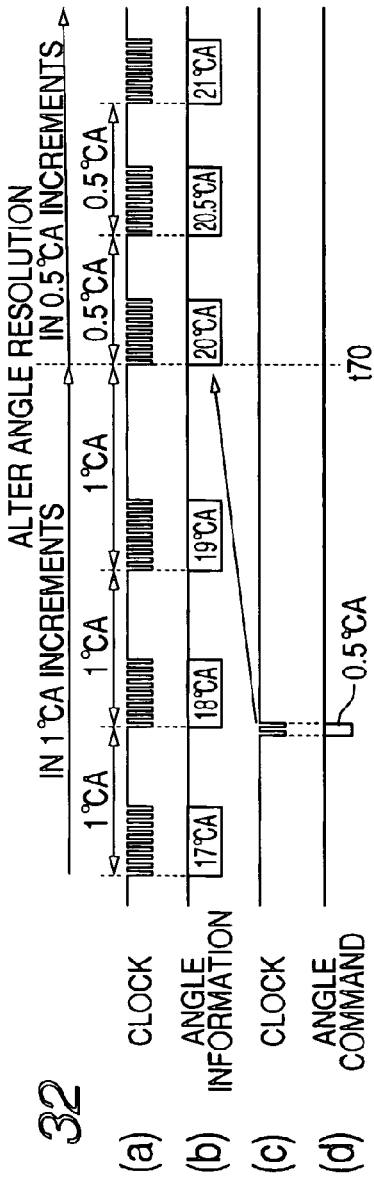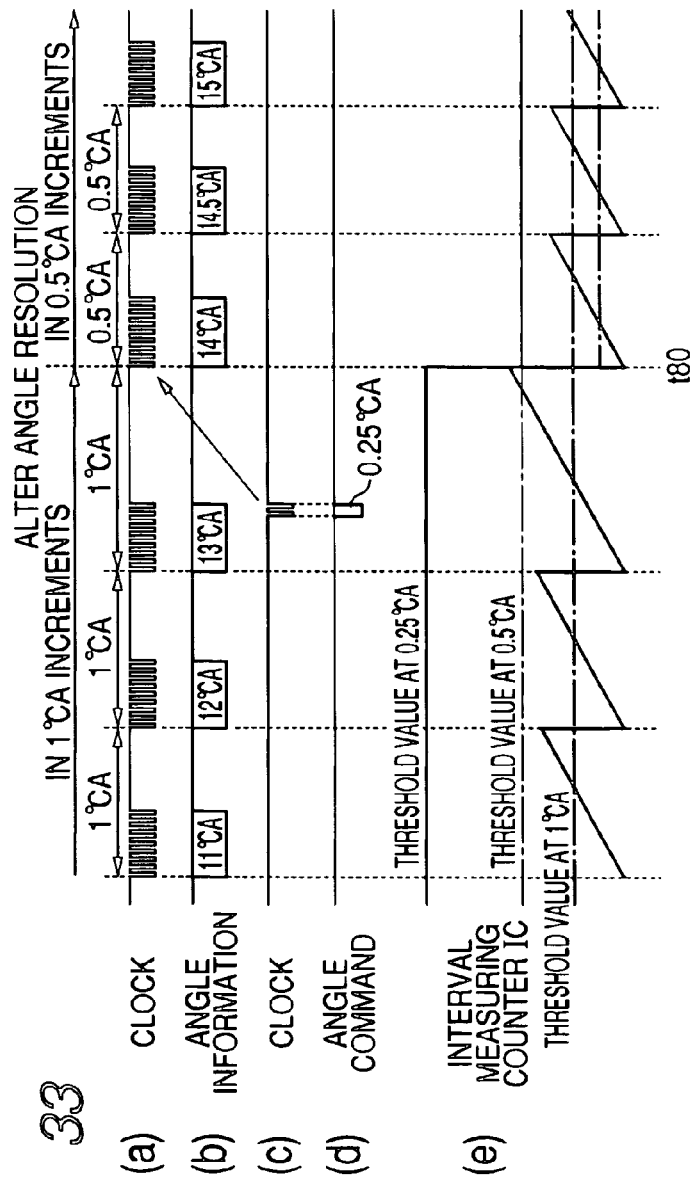
FIG. 32
FIG. 33

DEVICE FOR DETECTING POSITIONS OF OBJECT

CROSS REFERENCE TO RELATED APPLICATION

The present application relates to and incorporates by reference Japanese Patent application No. 2004-374361 filed on Dec. 24, 2004.

BACKGROUND OF THE INVENTION

1. Technical Field of the Invention

The present invention relates to position detecting devices for detecting motional positions of objects to be detected and, more particularly, to a useful device that is employed in a device etc., for detecting a rotational angle (angular position) of a crankshaft or other members of, for instance, an on-vehicle engine.

2. Related Art

In the related art, a position detecting device of such a type, i.e., more particularly, a device disclosed, for instance, in U.S. Pat. No. 4,233,592 has heretofore been known as a device for detecting a rotational angle of a crankshaft of an engine. With such a device, a gear type rotor, mounted on and rotatable with the crankshaft, has one area formed with a notched portion, which is detected by a rotary angular sensor disposed in close proximity to the rotor for detecting a passage of each tooth for thereby detecting the notched portion based on which the rotational angle (angular position) of the rotor (crankshaft) is detected as a reference on the detected portion.

The other position detecting device of such a type includes a device that is disclosed in, for instance, Japanese Patent No. 2570442. This device is configured in a way to detect a rotational angle of the crankshaft of the engine, described above, in conjunction with a rotational angle of a camshaft mechanically connected to the crankshaft through a belt or a chain or the like. The device includes a sensor, detects the presence of a given angular position every time the rotational angle of the camshaft lies at the given angular position, and discriminate a combustion cylinder of the engine based on contrast between detection output of the sensor and a reference angle of the crankshaft.

Either way with these devices, the rotational angle of the crankshaft or camshaft is detected in such a way to allow detected angle information to be provided to operational control of the engine, by which operations are executed to maintain appropriate controls of a fuel injection timing and an ignition timing or the like.

By the way, in recent years, attempts have heretofore been made to perform control to temporarily stop the engine during a halt of a vehicle when waiting for the traffic light to change with a view to improving fuel consumption and reducing exhaust emissions. However, during stopping operations of the engine, rapid drop or unstable status usually tend to occur on a rotational speed of the crankshaft, resulting in deterioration in reliability of angle information, mentioned above, which is detected under such defective circumstances. That is, a difficulty is encountered in properly detecting even the notched portion, playing a role as a reference of angle information, of the rotor, resulting in an increase in probability of causing defects wherein the presence of the notched portion is detected at a rotational angle (angular position) in the absence of the notched portion. Also, such control undergoes defects wherein during restart of the engine, angle information cannot be provided for operational control of the engine unless the notched portion of the rotor is detected, suffering inevitable deteriorations in startability or degradation in emissions.

Also, not only the device, configured to detect the rotational angle of the detection object including the crankshaft or the camshaft (that is exactly a rotor mounted on each of the shafts), but also the device, associated with a detection object provided with a specified reference position to allow the reference position to be detected for deriving a motional position, undergo actual situations generally common to each other. That is, under circumstances where a difficulty is encountered in detecting the reference position due to the occurrence of unstable status in the motion speed of the detection object or a halt of the detection object in motion, inevitable deterioration occurs in reliability related to relevant positional information.

SUMMARY OF THE INVENTION

The present invention has been completed with the above actual situations in mind and has an object to provide a position detecting device that is able to accurately obtain a motional position with high reliability regardless of behavior of a detection object.

To achieve the above object, a first aspect of the present invention provides a position detecting device comprising a positional information transmitter operative to create positional information of a detection object depending on positional variation resulting from motion of the detection object detected by a position sensor and transmit resulting positional information on a leading role every time the positional variation of the detection object reaches a given unit quantity and a motional position computing section playing a role as a slave device to receive transmitted positional information and count starting edges of the positional information to derive a motional position of the detection object.

With such a structure playing a role as the position detecting device, a communication system is comprised of a master device, composed of a positional information transmitter, and a slave device, composed of the motional position computing section, and resulting positional information, created by the positional information transmitter, of the detection object is basically transmitted to the motional position computing section without suffering restriction in a status of the motional position computing section.

That is, no need arises for the motional position computing section to directly monitor behavior of the detection object and the motional position computing section receives positional information transmitted from the positional information transmitter to detect a starting edge thereof while counting detected starting edges to recognize a motional position of the detection object. Also, the motional position computing section counts only the starting edges of positional information for obtaining the motional position of the detection object without reading the content of transmitted positional information in each case, resulting in a capability of obtaining the motional position of the detection object without delay in response at a timing substantially in synchronism with positional variation for each given unit quantity of the detection object. Further, the positional information transmitter is able to create positional information even if the detection object remains halted as far as the positional information transmitter per se remains operative.

The motional position computing section is able to make judgment, in response to the absence of variation in a value being counted, that the detection object is halted at a motional position corresponding to the resulting count value. Upon restart in motion of the detection object, the positional information transmitter immediately creates relevant positional information, which in turn is transmitted, and the motional position computing section synchronizes with such operation and restarts counting operation in a mode continuing from a preceding count value. In that sense, with the structure of the position detecting device, the motional position of the detection object is detected with high reliability.

That is, even if the position detecting device plays a role as a device, operative to perform control so as to temporarily stop the engine during the halt of the vehicle when waiting for the traffic lights to change as described above, which detects the rotational angle (angular position) of the crankshaft or the like of the engine, the rotational angle can be properly detected at all times regardless of behavior of the crankshaft corresponding to the detection object.

In such a case, as attained by the present invention defined in a second aspect, the positional information transmitter is configured to create positional information as absolute positional information and the motional position computing section is configured to correct the motional position of the detection object, derived upon counting the starting edges of positional information, depending on absolute positional information transmitted from the positional information transmitter. This results in a further increase in detection accuracy and reliability in detecting the motional position of the detection object mentioned above. That is, detection accuracy can be adequately enhanced in detecting the motional position of the detection object, obtained from the motional position computing section during counting operation thereof, as far as no disturbance occurs in the communication system, set forth above, and if positional information, created by the positional information transmitter, is involved in such absolute positional information, such positional information can be corrected upon reading thereof even in the occurrence of deviations of some kind in the counting operation mentioned above. Accordingly, the motional position computing section, configured in such a structure to correct the count value, depending on relevant positional information as the need arises or at fixed intervals, naturally results in further improvements in detection accuracy and reliability in detecting the motional position of the detection object.

More particularly, in executing the correction, as attained by the present invention defined in a third aspect, absolute positional information of the detection object, transmitted from the positional information transmitter, is read in each time the motional position of the detection object, obtained by the motional position computing section, reaches a value corresponding to a given momentum of the detection object. Then, comparison is made between a value, represented by absolute positional information, and such a reached value and if a difference exists between these values, it is preferable to correct a value of the resulting motional position, based on a value of read-in absolute positional information at a subsequent count timing, in view of addressing the issue of deviation occurring in the counting operation on an early stage. Incidentally, under circumstances where the motional position of the detection object, derived from the motional position computing section, is provided for control or some kind such as, for instance, engine control mentioned above and the momentum of the detection object, assigned to be an indicator in performing such control, is preliminarily well-established, that is, for instance, when performing engine control, the operation is executed to perform control determined for resolution in "10° CA" increments with an indicator of "10° CA (Crankshaft Angle)", a value, corresponding to a given momentum of the detection object, representing a timing at which absolute positional position of the detection object to be transmitted is read in and the above-described comparison is made is set to a value preceding a value of momentum of the detection object, assigned to be the indicator, that is, a value of, for instance, resolution in "9° CA" increments in the example mentioned above. This allows the above-described correction to be executed each time the momentum of the detection object reaches the momentum assigned to be the indicator in relevant control, resulting in a capability of performing control with appropriately ensured accuracy.

Moreover, as attained by the present invention defined in a forth aspect, with the position detection device defined in of the first aspect, the positional information transmitter is configured to transmit resulting positional information to the motional position computing section in serial communication in synchronism with a clock signal and the motional position computing section is configured to detect starting edges of those positional information based on initial edges of clock signals received in synchronism with respective positional information. This provides an ease of transmitting positional information mentioned above, causing the motional position computing section to detect the starting edges of positional information and reading in such positional information.

Additionally, in such a case, as attained by the present invention defined in a fifth aspect, the positional information transmitter may also be effective to operate such that the lower the motional speed of the detection object, the finer will be the subdivision, that is, the higher will be the resolution, to be made of a value representing a given unit quantity of positional variation of the detection object. Thus, by creating positional information with resolution varying such that the lower the motional speed of the detection object, the higher will be the resolution, control may be possibly performed with high angular accuracy at a low speed in rotational speeds even when, for instance, performing engine control as set forth above, while making it possible to achieve reduction in operation loads at a high speed in the rotational speeds.

Also, in such a case, more particularly, as attained by the present invention defined in a sixth aspect, the positional information transmitter may execute the operation in a way to create positional information with resolution represented by a given unit quantity of positional variation of the detection object to be assigned as a timing at which the transmission is performed, upon which information representing the given unit quantity, indicative of information representing the resolution, is added to resulting positional information for transmission to the motional position computing section. This provides a capability even for the motional position computing section to accurately grasp altered resolution representing such positional information.

In addition, as attained by the present invention defined in a seventh aspect, with the positional information transmitter defined in the forth aspect, the positional information transmitter is configured to detect a motional halt of the detection object in response to the absence of positional variation equivalent to the given unit quantity of the detection object even when a first time internal has elapsed after positional information has been created and subsequently allow the operation to shift from positional synchronizing communication, synchronizing with positional variation of the detection object, to time synchronizing communication, synchronizing with time, until positional variation equivalent to the given unit quantity is detected from the detection object. Also, the motional position computing section is configured to interrupt the counting operation during a period in which the operation is shifted to time synchronizing communication.

As set forth above, the positional information transmitter is able to create positional information as far as it is rendered operative even under situations where the detection object remains halted. The motional position computing section is responsive to the absence of variation in a value resulting from the courting operation to make judgment that the detection object remains halted at a motional position corresponding to the count value. However, if positional synchronizing communication continues during a period in which the detection object remains halted, the positional information transmitter ceases the transmission of positional information for a long period of time with the resultant issues with indispensable adverse affects such as disturbances, previously mentioned, encountered by the communication system. Therefore, like the structure set forth above, shifting the operation to time synchronizing communication during the halt of the detection object results in ability for positional information to be continuously transferred to the motional position computing section even during the halt of the detection object, enabling the motional position computing section to smoothly restart detecting a motional position in resumed movement of a detection object.

Also, in executing time synchronizing communication in such a way described above, the positional information transmitter and motional position computing section may be embodied in preferred structures. As attained by the present invention defined in, for instance, an eighth aspect, one structure is implemented in a manner described below.

(A) The motional position computing section interrupts the counting operation in the absence of a starting edge of subsequent positional information even when a second time interval, shorter than the first time interval mentioned above, has elapsed after the starting edge of positional information has been counted, and read in positional information each time positional information is transmitted from the positional information transmitter while during such a time period, the positional information transmitter transmits positional information executing time synchronizing communication in synchronism with a third time interval longer than the second time interval.

Another alternative structure may be implemented in a manner described below as attained in the present invention defined in a ninth aspect.

(B) The positional information transmitter allows information, i.e., for instance, a flag representing a motion halt of a detection object, to be added to resulting positional information in response detection of the motion halt of the detection object for transmission to the motional position computing section and the motional position computing section monitors the presence of or absence of added information, representing the motion halt of the detection object, based on received positional information upon which the counting operation is interrupted during a period in which judgment is made that information representing the motion halt remains added.

Or, another structure may be configured in an alternative as attained by the present invention defined in a tenth aspect.

(C) The positional information transmitter allows information, i.e., for instance, a flag representing a motion halt of a detection object, to be added to resulting positional information in response detection of the motion halt of the detection object for transmission to the motional position computing section and the motional position computing section counts the starting edge of positional information after which the counting operation is interrupted based on a logical sum condition under which no starting edge of subsequent positional information is detected and no information representing the motion halt of the detection object is added to received positional information even upon elapse of the second time interval shorter than the first time interval while reading in positional information being transmitted from the positional information transmitter.

Incidentally, the structure (A) (defined in the eighth aspect), set forth above, makes it possible to shift the operation to time synchronizing communication in a relatively easy fashion or return from time synchronizing communication to positional synchronizing communication upon merely setting the first to third time intervals. However, during operation in return to positional synchronizing communication, since a probability arises wherein the motional position computing section does not count a starting edge of positional information immediately after returning to positional synchronizing communication, there is a probability wherein the count value needs to be corrected (corrected upward) based on positional information being received at such a timing. Moreover, even with the structure (B) (defined in a ninth aspect) set forth above, it becomes easy to shift the operation to time synchronizing communication or return the operation from time synchronizing communication to positional synchronizing communication. In this case, also, during a period in which time synchronizing communication is performed, the operation may be sufficed to merely satisfy the relationship of "First Time Interval>Second Time Interval" and the third time interval, referred to in the structure (C) mentioned above, can be withdrawn from consideration, making it possible to shorten a transmission period of positional information during time synchronizing communication. However, in such a case, since the motional position computing section encounters a probability with a tendency of erroneously counting a starting edge of initial positional information during a period of shift to time synchronizing communication, a need probably arises for the count value to be corrected (corrected downward) depending on positional information being subsequently received. In addition, the structure (C) (defined in a tenth aspect) set forth above results from a combination between advantages of the structure (A) and structure (B). Such a structure results in a capability of adopting information (flag), representing the motion halt of the detection object, to shorten the transmission period of positional information during time synchronizing communication. Furthermore, adopting the second time interval, referred to in the structure (A), also provides no probability for the motional position computing section to erroneously count the starting edge of initial positional information during the shift to time synchronizing communication. That is, with the structure (C) mentioned above, the motional position computing section fundamentally has no need to correct the count value occurring during shift in communication modes.

No matter what any one of these structures is, due to ability of continuously transferring positional information to the motional position computing section even during the motion halt of the detection object, the motional position computing section enables smooth resumption of detecting the motional position during motional resumption of the detection object in a manner as previously mentioned. Thus, in an event that the position detection device is incorporated in an apparatus, adapted to perform control so as to temporarily stop an engine during a halt of a vehicle under a situation such as, for instance, when waiting for the traffic lights to change, which is configured to detect a rotary angle (angular position) of a crankshaft of the engine, operational control can be smoothly resumed even when restarting the engine.

In the meanwhile, the position detection device, defined in the fourth aspect, may also take the form of a structure, adapted to perform serial communication in synchronism with a clock signal, in an alternative mode as implemented in the present invention defined in, for instance, an eleventh aspect. That is, the positional information transmitter transmits resulting positional information as a ternary valued signal, modulated with the clock signal, to the motional position computing section and the motional position computing section separates the received ternary valued signal into positional information and clock signal to enable the reading of positional information. Even such a structure makes it possible to have expectation in obtaining advantageous effects equivalent to those of the invention defined in the fourth to tenth aspects set forth above.

Further, as attained by the present invention defined in a twelfth aspect, it may be effective to take the form of a structure wherein the motional position computing section further includes a bit counter, which is operative to count a bit string, received in a manner described above, in a count value and initialized based on a logical sum under which the resulting count value matches the number of bits of information transmitted from the positional information transmitter and there is a space greater than a value of two clocks of the clock signals before the count value takes the value of a bit number of information transmitted from the positional information transmitter. That is, in such a case, monitoring the behavior of the bit counter enables the behavior to be identified even in the presence of noises admixed to a communication system, providing an ease for the motional position computing section to correct erroneous count value resulting from such disturbance.

Furthermore, the position detection device, defined in the first aspect, is not limited to serial communication, described above, synchronizing with the pulse signal and may also take the form of another structure, as attained by the present invention defined in, for instance, a thirteenth aspect. That is, the positional information transmitter transmits resulting positional information as a pulse signal, whose pulse width is modulated depending on those positional information, to the motional position computing section which in turn is operative to detect a starting edge of positional information depending on an edge of each pulse signal being received. Even such a structure enables the motional position computing section to compute a motional position of the detection object depending on the starting edge of positional information while obtaining a pulse width of the received pulse signal depending on needs, enabling actual positional information to be confirmed on a case-by-case basis.

Also, a mode in which the positional information transmitter modulates the pulse width or a mode in which the pulse signal, whose pulse width is modulated, is transmitted may be implemented in a manner described below as attained by the present invention defined in, for instance, a fourteenth aspect.

(D) The pulse width modulation is executed such that a pulse width of each pulse signal, to be transmitted, takes value directly corresponding to each of resulting positional information.

Or, in an alternative, another structure is implemented as attained by the present invention defined in a fifteenth aspect.

(E) The pulse width is modulated such that the pulse width of the pulse signal being transmitted take the value directly corresponding to intermittently relevant positional information for a given varying quantity of resulting positional information while taking a minimal pulse width at the other transmission timings.

Here, the positional information transmitter with such a structure (D) (defined in the fourteenth aspect) enables the provision of actual positional information at all times even under circumstances where the motional position computing section executes the operation at any timing to confirm actual positional information depending on the pulse width mentioned above. Also, the positional information transmitter with such a structure (E) (defined in a fifteenth aspect) enables to ensure a further increase in a pulse, width at a portion directly associated with relevant positional information. Thus, the pulse widths can be measured with less accuracy, enabling the motional position computing section to have a pulse width measuring section configured in a simplified structure. That is, in cases where the motional position computing section executes the operation to confirm actual positional information on an irregular basis, the structure (D) may be preferably used. In cases where the motional position computing section executes the operation to confirm actual positional information at fixed intervals for each varying quantity of positional information, the structure (E) may be preferably used.

On the other hand, with the present invention defined in a sixteenth aspect, the position detection device, defined in the first aspect, may take the form of a structure wherein the motional position computing section additionally includes means for transmitting information, representing a given unit quantity designating a given quantity of positional variation of a detection object representing a timing at which the positional information transmitter transmits positional information, to the positional information transmitter and the positional information transmitter alters the given unit quantity of positional information of the detection object, representing the transmission timing of positional information, in response to received information indicative of the unit quantity.

With such a structure of the position detection device, due to the motional position computing section enabled to request a given unit quantity (resolution) of positional variation of an intended detection object, under circumstances where the motional position of the detection object, requested by the motional position computing section, is provided to control of some kind such as, for instance, engine control mentioned above, the positional position of the detection object can be obtained with a requisite and adequate degree of resolution on a case-by-case basis during such controls.

However, even in such a case, the positional information transmitter may preferably take the form of a structure, as attained by the present invention defined in a seventeenth aspect, wherein when judgment is made that it is hard in terms of a timing to transmit positional information with a unit quantity based on information representing the received unit quantity, the unit quantity, related to positional variation of the detection object, is altered to a unit quantity available in terms of the timing for positional information to be transmitted upon which information, representing such an altered unit quantity, is added to resulting positional information for transmission to the motional position computing section. That is, since positional information, transmitted by the positional information transmitter, naturally has a limited transmission cycle, adopting the position detection device with such a structure enables the prevention of the occurrence of defects in garbled communication on positional information.

In such a case, as attained by the present invention particularly defined in an eighteenth aspect, the positional information transmitter may include means for measuring intervals during which positional information are transmitted The intervals are set so as to include a plurality of threshold values representing an allowable range on a transmission interval varying such that the smaller the value of the unit quantity in terms of positional variation of the detection object, the greater will be the value of the allowable range. Additionally, the unit quantity is altered in a range of the unit quantity corresponding to the greatest threshold value which a measured value of the interval exceeds when altering the unit quantity in response to a receipt of information designating the unit quantity transmitted from the motional position computing section. This results in a capability for a transmission cycle (interval) of positional information to be appropriately maintained while maximizing a command from the motional position computing section. That is, by so doing, it becomes possible to accurately prevent the occurrence of garbled communication on positional information mentioned above.

Moreover, as attained by the present invention defined in a nineteenth aspect, the position detection device, defined in the first aspect, may adopt a magnetic sensor operative to convert variation of a magnetic field, accompanied by motions of a detection object, detected by a magnetic detection element to a linear motility characteristic to derive an absolute value of positional variation accompanied by motion of the detection object. Such a magnetic sensor makes it possible to detect positional variation of the detection object in a non-contact fashion. Furthermore, due to the magnetic sensor taking the form of the structure set forth above wherein detected positional variation is converted to the linear motility characteristic to derive the absolute value of positional variation accompanied by motions of the detection object, the positional information transmitter is enabled to provide an increase in a degree of freedom in creating positional information described above.

More particularly, as attained by the present invention defined in a twelfth aspect, the magnetic sensor comprises a magnetized rotor, separately magnetized in North and South poles, and magnetic detection elements including two hall elements arranged to output sine-wave voltages deviated in phase by 90 degrees with rotation of the magnetized rotor, wherein when the magnetized rotor has a rotary angle $\theta$, one of the hall elements generates an output voltage A as expressed by $A=\sin\theta$ and the other one of the hall elements generates an output voltage B as expressed by $B=\cos\theta$ and the means for converting variation of a magnetic field, accompanied by motion of the detection object, to a motility characteristic includes means for converting the rotary angle $\theta$ of the magnetized rotor as expressed by $\theta=\tan^{-1}(A/B)$, wherein when angular variation, with a value equivalent to 350 degrees, in the rotary angle $\theta$ of the magnetized rotor, accompanied by motion of the magnetized rotor, is derived depending on a converted value to allow the position detection device to be used as a rotation detection device, the positional information transmitter is able to satisfy a performance, required for creating positional information, to the utmost extent.

Besides, as attained by the present invention defined in a twenty-first aspect, in employing the position detection device as the rotation detection device, the positional information transmitter allows the magnetic sensor to detect the rotary angle of the magnetized rotor, mounted on a crankshaft of an engine, for transmitting rotary angle information of the crankshaft in each revolution to the motional position computing section and the motional position computing section is incorporated in an engine control unit, operative to control operations of the engine, to provide the count value as rotary angle information of the crankshaft for the operations of the engine to be controlled. Thus, with the structure adapted to perform control in a way to temporarily stop the engine during a halt of a vehicle such as when waiting traffic lights to change as described above, the rotary angle can be properly detected at all times regardless of behavior of the crankshaft or the like when detecting the rotary angle (angular position) of the crankshaft or the like of the engine. That is, this results in a capability for engine control to be ensured with a further increase in stability and accuracy.

BRIEF DESCRIPTION OF THE DRAWINGS

In the accompanying drawings:

FIG. 2 is a typical view showing a positional relationship among hall elements forming a rotation sensor of a rotational information transmitter related to the first to seventh embodiments, magnetized rotor and a crankshaft;

FIG. 3($a$ to $c$) is a graph showing an output of the hall element and a graph showing an output of the rotation sensor, respectively;

FIG. 4 is a typical view showing a bit string to be transmitted from a communication control circuit of the rotational information transmitter of the first embodiment;

FIG. 5($a$ to $c$) shows timing charts showing timings at which an angular counter is counted up in a rotation detection device of the first embodiment;

FIG. 6($a$ to $c$) shows timing charts representing behaviors of the angular counter;

FIG. 7($a$ to $c$) shows timing charts, representing respective mode of an absolute angle of the magnetized rotor during rotation thereof at a low speed, a train of clock pulses, angle information and recognized angle of a computing unit according to the prior art, under circumstances where the computing unit reads in a whole of angle information;

FIG. 8($a$ to $c$) shows timing charts, representing respective mode of the absolute angle of the magnetized rotor during rotation thereof at a high speed, the train of clock pulses, angle information and the recognized angle of the computing unit according to the prior art, under circumstances where the computing unit reads in the whole of angle information;

FIG. 9($a$ to $c$) shows timing charts showing an example of the timing at which an angular counter, executed by the computing unit, is checked and corrected in the rotation detection device of the first embodiment;

FIG. 10($a$ to $c$) shows timing charts showing another example of the timing at which the angular counter, executed by the computing unit, is checked and corrected in the rotation detection device of the first embodiment;

FIG. 11($a$ to $d$) shows timing charts, representing respective modes of clock pulses, angle information, an edge interval counter and the angular counter, of the rotation detection device of the first embodiment under circumstances where the rotational information transmitter shifts operation from angular synchronizing communication to time synchronizing communication;

FIG. 12($a$ to $d$) shows timing charts, representing respective modes of the clock pulses, angle information, the edge interval counter and the angular counter, of the rotation detection device of the first embodiment under circumstances where the rotational information transmitter shifts operation from time synchronizing communication to angular synchronizing communication;

FIG. 15($a$ to $d$) shows timing charts, representing respective modes of clock pulses, angle information, a rotational stop flag and the angular counter of the rotation detection device of the second embodiment under circumstances where the rotational information transmitter shifts operation from angular synchronizing communication to time synchronizing communication;

FIG. 16(a to d) shows timing charts, representing respective modes of the clock pulses, angle information, the rotational stop flag and the angular counter of the rotation detection device of the second embodiment under circumstances where the rotational information transmitter shifts operation from time synchronizing communication to angular synchronizing communication;

FIG. 17(a to e) shows timing charts, representing respective modes of the clock pulses, angle information, the rotational stop flag, the edge interval counter and the angular counter of the rotation detection device of the second embodiment under circumstances where the rotational information transmitter shifts operation from time synchronizing communication to angular synchronizing communication;

FIG. 18 is a typical view showing a bit string to be transmitted from a communication control circuit of a rotational information transmitter of the third embodiment;

FIG. 26(a to b) shows timing charts, representing variation in pulse width of a pulse signal and timing, at which the rotational position computing section is operative in response to the pulse signal to increment the angular counter, of the rotation detection device of the fifth embodiment;

FIG. 27(a to b) shows examples of timing charts, representing variation in pulse width of a pulse signal and timing, at which the rotational position computing section is operative in response to the pulse signal to increment the angular counter, of the rotation detection device of the fifth embodiment;

FIG. 28(a to b) shows other examples of timing charts, representing variation in pulse width of a pulse signal and timing, at which the rotational position computing section is operative in response to the pulse signal to increment the angular counter, of the rotation detection device of the fifth embodiment;

FIG. 30(a to d) shows timing charts, representing one example of a train of clock pulses and angle information transmitted from the rotational information transmitter and another example of a train of clock pulses and angle information transmitted from the rotational position computing section in contrast to each other, of the rotation detection device of the sixth embodiment;

FIG. 31(a to d) shows timing charts, representing one example of a train of clock pulses and angle information transmitted from the rotational information transmitter and another example of a train of clock pulses and angle information transmitted from the rotational position computing section in contrast to each other, of the rotation detection device of the sixth embodiment;

FIG. 32(a to d) shows timing charts, representing one examples of a train of clock pulses and angle information transmitted from the rotational information transmitter and another examples of a train of clock pulses and angle information transmitted from the rotational position computing section in contrast to each other, of the rotation detection device of the sixth embodiment;

FIG. 33(a to e) shows timing charts, representing one examples of a train of clock pulses and angle information transmitted from the rotational information transmitter and another example of a train of clock pulses and the other examples of a train of clock pulses, transmitted from the rotational position computing section, angular command information and behavior of an interval measuring counter in contrast to each other, of the rotation detection device of the seventh embodiment.

DETAILED DESCRIPTION OF PREFERRED EMBODIMENTS

First Embodiment

Now, description will now be made of a first embodiment of a position detecting device according to the present invention implemented in a rotation detection device for detecting a rotational angle of a crankshaft of an engine to allow information of the resulting rotational angle to be used for achieving operational control of the engine.

The rotation detection device of the present embodiment is fundamentally comprised of a rotational information transmitter (positional information transmitter) that detects the rotational angle of the crankshaft to allow rotational angle information (positional information), indicative of the resulting rotational angle, to be transmitted, and a rotational position computing section (motional position computing section) obtaining a rotational angle of the crankshaft in response to resulting angle information.

With the rotation detection device of the present embodiment, a communication system is established between the rotational information transmitter, which plays a role as a master device, and the rotational position computing section that plays a role as a slave device.

Figure 1:
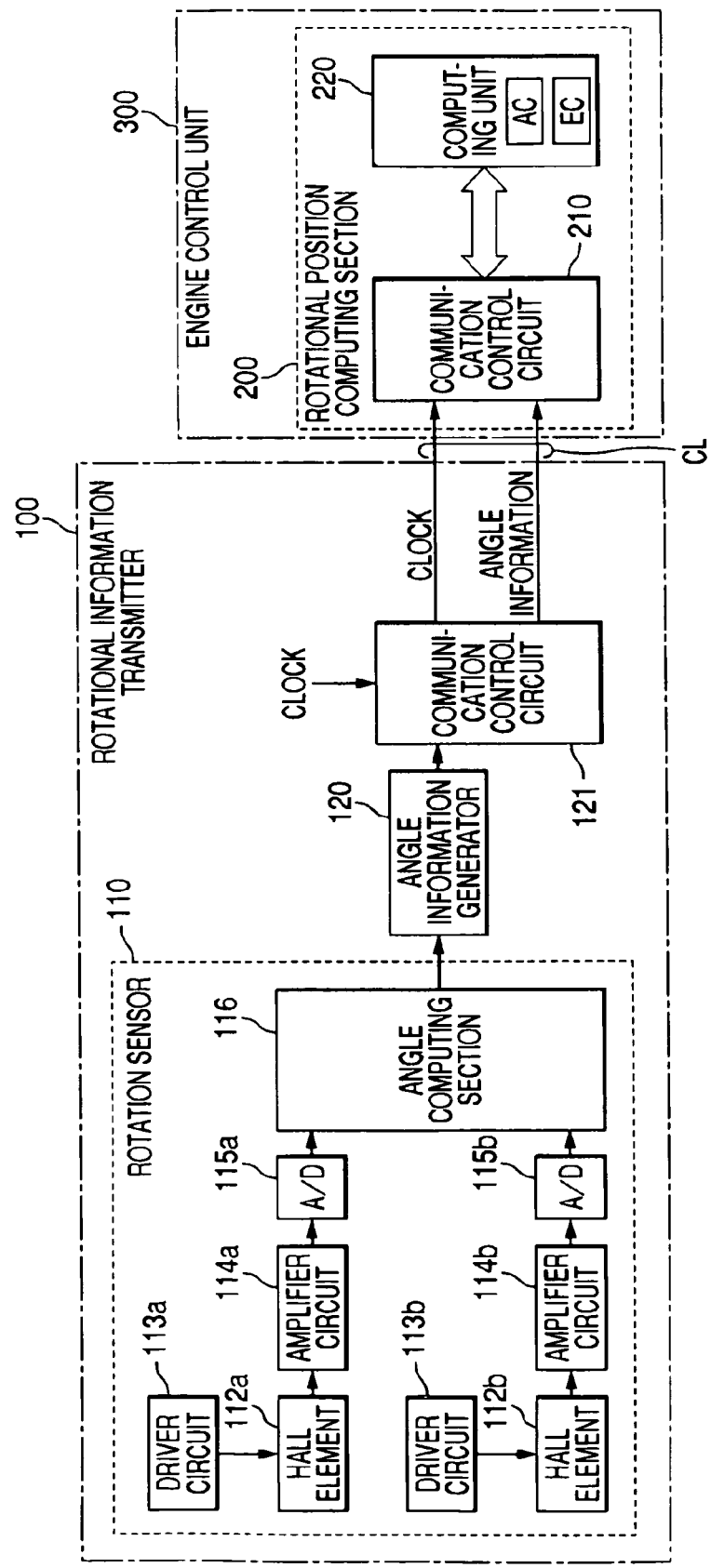
FIG. 1 is a block diagram showing an outline of a structure of a position detecting device, related to first to third embodiments, according to the present invention.

FIG. 1 is a block diagram showing an outline of the rotation detection device of the present embodiment. As shown in FIG. 1, the rotational information transmitter 100 includes a rotation sensor 110, which is composed of a magnet sensor. The rotation sensor 110 causes an angular position generator 120 to generate angle information based on a value corresponding to variation in the rotational angle, resulting from rotation of the crankshaft, which is detected by the rotation sensor 110.

With the rotational information transmitter 100, resulting angle information is supplied to a communication control circuit 121 through which angle information is transmitted to a rotational position computing section 200, mounted on an engine control unit 300 operative to communicate on a serial communication basis in synchronism with a train of clock pulses (clock signals).

In order for the communication, communication lines CL connect both the communication control circuit 121 and a communication control circuit of the engine control unit 300, as shown in FIG. 1.

The rotation sensor 110 includes hall elements 112*a* and 112*b*, playing roles as magnetic detector elements, to detect variation of magnetic field, caused by rotation of the crankshaft, which is quantized with desired resolution, after which the resulting quantized variation of magnetic field is converted to a linear motion characteristic to obtain an absolute value of the rotational angle accompanied by rotation of the crankshaft. Here, detailed description is made of the positional relationship between the hall elements 112*a*, 112*b* and the crankshaft and a mode of converting outputs of the hall elements 112*a*, 112*b*.

As shown in FIG. 2, the crankshaft CS carries thereon a disc-shaped magnetized rotor 111 that is separately magnetized into N and S poles and two hall elements 112*a*, 112*b* are disposed in a configuration such that magnet sensing surfaces extend in a direction perpendicular to the magnetized rotor 111 at positions in a close proximity thereto. This results in capabilities for the hall elements 112*a*, 112*b* to output sine-wave voltages different in phase only by 90°, as shown in FIG. 3(*a*), associated with rotation of the magnetized rotor 111. Also, these hall elements 112*a*, 112*b* are supplied with drive currents from driver circuits 113*a*, 113*b* shown in FIG. 1.

As shown in FIG. 1, further, the rotation sensor 110 takes the form of a structure that is comprised of, in addition to the hall elements 112*a*, 112*b* and associated driver circuits 113*a*, 113*b*, amplifier circuits 114*a*, 114*b*, A/D converters 115*a*, 115*b* and an angle computing section 116. This angle computing section 116 can be formed using a CPU (central processing unit).

That is, hall voltages, outputted from the hall elements 112*a*, 112*b* accompanied by rotation of the crankshaft CS, are amplified by the amplifier circuits 114*a*, 114*b*, respectively, to respective levels, upon which the amplified hall voltages are inputted to the A/D converters 115*a*, 115*b*. The A/D converters 115*a*, 115*b* quantize the amplified hall voltages with given resolutions whereby the rotational angle of the crankshaft CS is transformed to discrete values associated with the hall voltages.

The angle computing section 116 converts such discrete values to linear motional characteristics, i.e., characteristics falling in the relationship in which an output of the rotational sensor 110 is directly proportional to the rotational angle of the crankshaft CS, thereby outputting angle information, indicative of the rotational angle θ of the crankshaft CS at a timing when calculation is performed based on such motional characteristics, to the angle information generator 120.

In particular, as shown in FIG. 3(*b*), when indicating the rotational angle of the magnetized rotor 111 (crankshaft CS) by θ while designating the output A of one hall element 112*a* by sine θ whereas the output B of the other hall element 112*b* is designated by cos θ, the rotational angle θ is calculated as "θ=tan$^{-1}$ (A/B)". Since a value, outputted from the rotation sensor 110 in response to the rotational angle θ resulting from such calculation, takes a unique value with respect to the rotational angle θ for each rotation (−180° to +180°) of the magnetized rotor 111 mentioned above, the output of the rotation sensor 110 designates an absolute angle of the crankshaft CS for each revolution thereof.

In the meanwhile, with the rotational information transmitter 100 shown in FIG. 1, the angle information generator 120 plays a role as a section operative such that among angle information (output of the rotational sensor 110) retrieved in such a way, related angle information for each predetermined rotational angle θ (in unit quantity) is outputted to the communication control circuit 121. Such a unit quantity is preset based on resolution of the rotational angle θ that is desired by an engine control unit 300. In this connection, with the present embodiment, the unit quantity is determined to lie in a value of 1° CA (crank angle). Therefore, in this case, angle information can be formed in 9-bit information that can represent a rotational angle of "360° CA" for one revolution of the crankshaft CS.

The angle information generator 120 further monitors the value (voltage value), retrieved from the angle computing section 116 of the rotation sensor 110 and makes judgment that if no variation takes place in such a value for a predetermined time interval X (first time period), the crankshaft CS remains halted. In such a case, the angle information generator 120 serves to output angle information in synchronism with a transmission interval Z (third time period) that is determined to be longer in time interval than a threshold time interval Y (second time period) set in an edge interval counter EC, which will be described alter, in place of outputting angle information in synchronism with the rotational angle θ of the crankshaft CS.

That is, when discriminated that the crankshaft CS remains halted, the angle information generator 120 shifts operation from angle synchronizing communication to time synchronizing communication to transmit angle information set forth above.

Further, with the rotational information transmitter 100, the communication control circuit 121 takes the form of a circuit wherein a bit string is formed of 9 bits, as shown in FIG. 4, based on angle information applied from the angle information generator 120 in such a way to allow the bit string to be synchronized with a train of clocks (clock signals) for transmission to a rotational position computing section 200, provided in the engine control unit 300, by one bit in synchronism with the clocks (clock signals).

On the other hand, the rotational position computing section 200, provided in the engine control unit 300, is comprised of a communication control circuit 210 and a computing unit 220 as shown in FIG. 1. The computing unit 220 is formed by using, for example, a CPU (central processing unit) working on predetermined software programs.

Among these, the communication control circuit 210 is formed of a circuit that incorporates a shift register for receiving angle information, transmitted in synchronism with the train of clock pulses set forth above, in synchronism therewith to temporarily store angle information for individual angle information. Each time these pieces of angle information are received, the computing unit 220 is applied with a count signal in synchronism with a first rising edge of the clock pulse and a receiving completion signal at a timing when the receiving of angle information is completed. Additionally, depending on a request from the computing unit 220, angle information, stored in such a way described above, is outputted to the computing unit 220.

The computing unit 220 plays a role as a device that operates to increment an internal angle counter AC (by a count of "+1") for each count signal applied from the communication control circuit 210 while during a shift in operation to time synchronizing communication set forth above or during correcting operation of the angle counter, which will be described below, providing requests for transmission of angle information, mentioned above, to the communication control circuit 210 at the respective required timings. Also, the computing unit 220 may be formed of a part of the engine control unit 300 at an area where engine control is performed.

Moreover, the angle counter AC takes the form of a structure that includes a low order angle counter, by which the counting is performed in "10.degree. CA" increments, and a high order angle counter by which the counting is performed in "10.degree. CA" increments. Therefore, the computing unit 220 increments the low order counter of the angle counter AC at each of timings, represented as timings t1 to t5, in response to the count signal, mentioned above, for each clock pulse received by the communication control circuit 210 and angle information in modes shown in FIGS. 5(a) to (b).

Additionally, the computing unit 220 resets the low order counter and increments the high order counter of the angle counter AC each time the relevant count value reaches a value of "10° CA". Behaviors of the low order angle counter and the high order angle counter, forming the angle counter AC, are exemplified in FIGS. 6(a) to (c) in terms of a transmission cycle of angle information described above.

During engine control, it is a usual practice to execute fuel injection control and ignition control for two turns of the crankshaft CS, that is, on one cycle of "720.degree. CA". This allows the computing unit 220 to recognize whether one of the counts of "1.degree. CA" to "360.degree. CA (0.degree. CA) lies in a value corresponding to a first turn of the crankshaft CS or whether one of the counts of "1.degree. CA" to "360.degree. CA (0.degree. CA) lies in a value corresponding to a second turn of the crankshaft CS, that is, a value ranging from "361.degree. CA" to "720.degree. CA (0.degree. CA) at all times depending on, for instance, flag operation or the like. The computing unit 220 also includes, in addition to the component part described above, a preceding edge interval counter EC, operative to a function during a stop in rotation of the crankshaft CS, whose detailed function is described below in detail with reference to FIGS. 11(a) to (d) and 12 (a) to (d).

The rotational position computing section 200 is configured in such a way, described above, to cooperate with the communication control circuit 210 and the computing unit 220 based on which the counting of the angle counter AC is executed in synchronism with a starting edge of angle information, that is, a starting edge of the clock pulse in the present exemplary case. This results in a capability of appropriately grasping the rotational angle θ of the crankshaft CS upon counting of the angle counter AC regardless of cases where a rotational speed (motional speed) of the crankshaft CS remains low as exemplified in an area A shown in FIG. 6(c) or where the rotational speed (motional speed) of the crankshaft CS remains high as exemplified in another area B shown in FIG. 6(c).

In addition, in the present embodiment, the computing unit 220 calculates, when completing reception of one string of bit data shown in FIG. 4, an absolute angle position of the crankshaft CS using the currently reception-completed data string before the starting edge of the first pulse of a second string of bit data to be received next. In other words, the computing unit 220 is always able to recognize the absolute angle position (i.e., absolute positional information) of the crankshaft CK before the arise of the starting edge of the next string of bit data.

In this connection, with the rotational position computing section 200, if attempt is made to cause the computing unit 220 to read received angle information on each case for recognizing the rotary read in, a subtle difference occurs between an angle, recognized by the computing unit 220, and an actual rotational angle θ of the magnetized rotor 111.

That is, under such a situation, a timing at which the rotational angle .theta. is recognized by the computing unit 220 occurs after all of the bits, forming angle information described above, are read in during a period between LSB (Least Significant Bit) and MSB (Most Significant Bit). As a result, when the computing unit 220 reads in retrieved angle information and recognizes the rotational angle .theta., the crankshaft CS further rotates forward, naturally causing a difference between the rotational angle .theta., to be recognized by the computing unit 220, and the actual rotational angle .theta. Such a difference rotational angle .theta. becomes increasingly prominent as the rotational speed of the crankshaft CS, that is, the rotational speed of the magnetized rotor 111 increases. Such a phenomenon is considered with reference to FIGS. 7(a) to (c) and 8(a) to (c).

For instance, FIGS. 7(a) to (c) show examples wherein the rotational information transmitter 100 transmits angle information in synchronism with variation for each of "1° CA" increments of the rotational angle θ of the magnetized rotor 111 under a status where the magnetized rotor 111 rotates at a high speed. In such a case, a timing at which the computing unit 220 recognizes that the rotational angle θ of the magnetized rotor 111 lies in a value of, for instance, "10° CA" occurs after entire angle information, related to "10° CA", have been read in (see FIG. 7(c)). Incidentally, however, supposing the magnetized rotor 111 further rotates forward only by "10.3° CA" increments (see FIG. 7(a)), a delay results in a value of "0.3° CA" increment between the rotational angle θ, to be recognized by the computing unit 220, and the actual rotational angle θ of the magnetized rotor 111.

FIGS. 8(a) to (c) show examples wherein the rotational information transmitter 100 transmits angle information in synchronism with variation for each of "1° CA" increments of the rotational angle θ of the magnetized rotor 111 under a status where the magnetized rotor 111 rotates at the high speed. Even under such situation, a timing at which the computing unit 220 recognizes the presence of the rotational angle θ of the magnetized rotor 111 marking a value of, for instance, "10° CA" occurs after entire angle information, related to "10° CA", has been accepted (see FIG. 8(c)).

Then, the rotational angle θ further increases when the magnetized rotor 111 rotates at such a high speed and, supposing the rotational angle θ lies at a value of, for instance, "10.5° CA", a delay occurs at a value of "0.5° CA" between the rotational angle θ, to be recognized by the computing unit 220, and the actual rotational angle θ of the magnetized rotor 111.

In this respect, like the present embodiment, if the position detecting device takes the form of a structure configured to allow the angle counter AC to execute the counting in synchronism with a starting edge of angle information (clock pulse) set forth above, no such a delay hardly occurs, resulting in a capability of capturing the rotational angle θ of the magnetized rotor 111.

However, when continuously executing the counting of the rotational angle θ of the magnetized rotor 111 in such a mode, there is a fear of the occurrence of a deviance in the resulting count value due to disturbances in the communication systems set forth above. Therefore, the present embodiment contemplates to have further functions to allow the angle counter AC to execute the counting in synchronism with the starting edge of angle information (clock pulse), mentioned above, while permitting the computing unit 220 to check and correct the count value of the angle counter AC at a predetermined timing.

More particularly, the computing unit 220 retrieves angle information, stored in the communication control circuit 210, each time the starting edges of, for instance, angle information (clock pulses) are detected ten times for comparison to be made between a value of the rotational angle θ, represented by such angle information, and the count value of the angle counter AC. If there is a difference between the values of the angle information and the angle counter AC, then, correction is performed in such a way to allow the count value of the angle counter AC to lie in a value of relevant angle information at the timing when the value of the angle counter AC is updated.

For instance, supposing the engine control unit 300 executes engine control at which time operation is executed to perform some kind of control for each of "10° CA" increments as an index of "10° CA", the computing unit 220 executes correction in modes shown in FIGS. 9 (*a*) to (*c*).

That is, in such a case, the computing unit 220 retrieves angle information each time the rotational angle θ of the magnetized rotor 111 (crankshaft CS) lies at values of "19° CA" and "29° CA" increments, or the like, just proximal to "10° CA" increments, and the operation is executed to make comparison (checking) between a value, represented by retrieved angle information, and a count value of the angle counter AC. If a count value of the angle counter AC marks a value of "16" when judgment is made that a value, resulting from angle information received ten times counting from "9° CA" forming the preceding checked angle, reaches a value of "19° CA", then, the operation is executed to correct a count value of the angle counter AC from "16" to "20" at a timing at which subsequent counting is executed.

Further, likewise, although such a checking operation is executed even at a timing when the rotational angle .theta., occurring when angle information have been received ten times for the next time interval, lies at a value of "29.degree. CA", in an example shown in FIG. 9(*a*) to (*c*), the resulting count value of the angle counter AC takes the same value of "29" as that of the value represented by angle information and, in such a case, the count value of the angle counter AC remains unchanged without correction.

Thus, reading the content of angle information at a timing preceding that of the rotational angle θ provided for engine control and correcting the count value of the angle counter AC at a subsequent timing depending on the relevant content results in a capability of suppressing deviation, caused in the angle counter AC, on an early stage. Eventually, this enables information, related to the rotational angle θ, to be provided with high reliability for engine control.

Also, a timing at which comparison (checking) is made between the value, represented by angle information, and the count value of the angle counter AC or a timing at which the count value is corrected may be arbitrarily determined. For instance, as exemplarily shown in FIGS. 10(*a*) to (*c*), comparison is made between the content of angle information and the count value of the angle counter AC at timings such as "10° CA", "20° CA" and "30° CA" or the like and if a difference exists between both values, the operation may be executed to correct the count value of the angle counter AC at a timing after angle information are received ten times. In such a case, as a result of comparison made at the timing when the rotational angle θ, mentioned above, reaches a value of, for instance, "10° CA", if a difference exists between the content of angle information and the count value of the angle counter AC, then, the count value of the angle counter AC is corrected at a timing when the rotational angle θ reaches a subsequent value of "20° CA".

Next, detailed description is made of operations of the rotation detection device of the present embodiment when the crankshaft CS (magnetized rotor 111) is stopped in rotation.

In cases where the crankshaft CS stops rotating, the rotational information transmitter 100 shifts its operation from angular synchronizing communication to time synchronizing communication in the manner as previously described above. In this case, the computing unit 220 allows the edge interval counter EC to measure a time interval between starting edges of angle information (clock pulses), that is, a time interval in which the count signal is applied from the communication control circuit 210.

If judgment is made that the measured time interval exceeds the given threshold value Y mentioned above, then, the angular counter AC stops counting. Incidentally, with the present embodiment, a transmission interval Z for time synchronizing communication to be executed for transmitting the clock pulses and angle information is determined to be 100 ms (milliseconds) and the threshold time interval Y is determined to be 30 ms as shown in FIGS. 11(*a*) to (*d*). Therefore, during such time synchronizing communication, a count value of the edge interval counter EC exceeds the threshold time interval Y at all times as shown in FIG. 11(*c*) and the computing unit 220 stops counting in the angle counter AC in a mode shown in FIG. 11(*d*) based on a fact that the relationship is established as "Transmission Interval Z>Threshold Value Y". During such time synchronizing communication, the computing unit 220 reads in the content of received angle information in each case and checks the value of the angle counter AC.

Therefore, even if the crankshaft CS (magnetized rotor 111) does not stop rotating, the computing unit 220 is able to recognize the rotational angle θ, that is, an absolute angle of a halted angle. Also, in this case, there is a need for the time interval X (of, for instance, 50 ms), during which the angle information generator 120 judges that the crankshaft CS remains halted, to be longer than the threshold time interval Y (of, for instance, 30 ms) as shown in FIGS. 11(*a*) to (*c*).

In the meanwhile, as the crankshaft CS restarts rotating again and the rotational information transmitter 100 shifts the operation from time synchronizing communication to initial angle synchronizing communication in response to the resulting detection, the rotational position computing section 200 receives the clock pulses and angle information at a time interval shorter than the threshold time interval Y, mentioned above, as shown in FIG. 12(*a*) to (*d*).

Then, the computing unit 220 also recognizes that the operation is shifted to angle synchronizing communication depending on such a relationship and restarts the counting of the angle counter AC based on the preceding count signal applied from the communication control circuit 210. However, since the computing unit 220 is unable at a time instant, designated at a timing t10 in FIG. 12(*c*), to discriminate whether the operation is shifted to angle synchronizing communication, the count value of the angle counter AC is corrected, as a result of checking the angle counter AC based on retrieved angle information from "11" to "12" in this example (see FIG. 12(*d*)). This enables the operation to be smoothly shifted based on angle synchronizing communication under a condition where matching of the count value of the angle counter AC is maintained.

As set forth above, with the rotation detection device of the present embodiment, advantageous effects can be obtained in a manner described below.

(1) The rotational position computing section 200 (computing unit 220) is structured in a configuration to count the starting edges of angle information (clock pulses) transmitted from the rotation information transmitter 100 for obtaining the rotational angle θ of the crankshaft CS. This results in a capability of recognizing the rotational angle θ of the crankshaft CS without directly monitoring a rotary status of the crankshaft CS with no delay in response.

(2) Further, the rotational position computing section 200 (computing unit 220) is implemented in a structure to check the count value of the angle counter AC upon retrieving the value represented by angle information for a predetermined rotational angle θ after which if a difference exists between these values, operation is executed to correct a value represented by angle information. Therefore, even if some kind of deviation occurs in the count value of the angle counter AC, the relevant count value can be corrected at regular intervals, enabling the rotational angle θ of the crankshaft CS to be detected with increased precision and reliability.

(3) Further, the content of angle information is read in at a timing "−1° CA" preceding that of the rotational angle θ used for engine control and the count value of the angle counter AC is made available to be corrected at a subsequent timing based on the relevant content. This results in a capability of suppressing deviation caused in the angle counter AC at an earlier stage, while enabling information, related to the rotational angle θ, to be provided for engine control with further increased reliability.

(4) The rotation detection device is structure such that when the crankshaft CS comes to a halt, the rotational information transmitter 100 shifts the operation from angular synchronizing communication to time synchronizing communication. Therefore, even during a halt of the crankshaft CS, angle information can be continuously delivered to the rotational position computing section 200.

(5) Also, the computing unit 220, forming the rotational position computing section 200, monitors the transmission interval of angle information using the edge interval counter EC during a communication period based on time synchronizing communication while reading angle information on each detection and checks the value of the angle counter AC depending on the resulting value.

Therefore, even under circumstances where the crankshaft CS stops rotating, an absolute angle of the relevant rotational angle (halted angle) θ can be recognized. Also, this means that even if the engine is controlled so as to temporarily stop in operation during a halt of a vehicle when waiting for traffic lights to change as mentioned above, quick startability can be guaranteed during restart of the engine depending on the rotational angle (halted angle) θ of the crankshaft CS being recognized.

(6) However, when the crankshaft CS restarts rotating and the rotational information transmitter 100 restores its angle synchronizing communication, the rotational position computing section 200 has concerns about inability of counting the starting edges of angle information (clock pulses) immediately after restart. To address such an issue, the computing unit 220 is configured to read in the content of received angle information during a period of time synchronizing communication for checking the count value of the angle counter AC and in the presence of the resultant difference between both values, the count value of the angle counter AC is corrected to a value designated by resulting angle information. Therefore, the above concerns can be addressed, enabling a smooth shift to occur in operation based on angle synchronizing communication.

(7) Additionally, the rotation sensor 110, forming the rotational information transmitter 100, employs a structure that converts angular variation of the crankshaft CS being detected to obtain angular variation, resulting from rotation of the crankshaft CS (magnetized rotor 111), in an absolute value. Therefore, the angle information generator 120, forming the rotational information transmitter 100, is able to generate angle information with a high degree of freedom.

Second Embodiment

Next, description will now be made of a position detecting device of a second embodiment according to the present invention.

The rotation detection device of the present embodiment differs from the first embodiment in respect of the method of checking and correcting the count value of the angle counter AC. That is, the rotation detection device of the present embodiment is structured to render the rotational position computing section 200 (computing unit 220) operative to newly transmit information, indicative of a phase in which the crankshaft CS (magnetized rotor 111) is halted, to the engine control unit 300 to allow the rotational position computing section 200 (computing unit 200) to correct the count value of the angle counter AC based on information indicative of a motion stop of the crankshaft CS.

Hereunder, detailed description is made of the rotation detection device with such a structure. Also, the rotation detection device of the present embodiment has the same fundamental structure as that of the first embodiment with common component parts bearing like reference numerals to omit relevant detailed description.

The angle information generator 120 of the rotational information transmitter 100 of the present embodiment generates rotational stop information, indicative of a stopped motion of the crankshaft CS upon detecting the presence of the crankshaft CS (magnetized rotor 111) remaining halted, to allow rotational stop information to be outputted with angle information to the communication control circuit 121.

Figure 13:
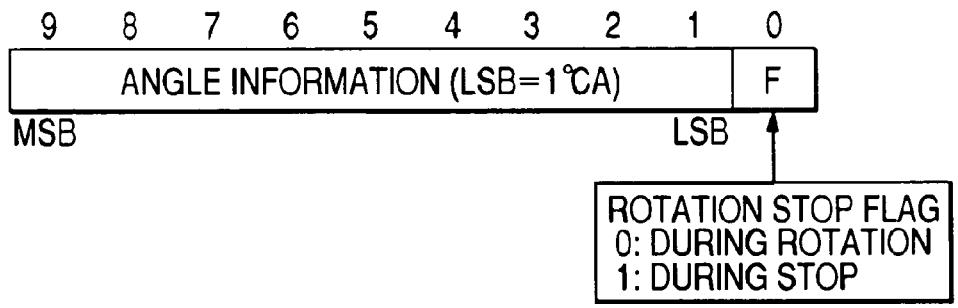
FIG. 13 is a typical view showing a bit string to be transmitted from the communication control circuit of the rotation detection device of the second embodiment.

The communication control circuit 121 creates a bit string composed of a total of ten bits, including a rotational stop flag with 1 bit, indicative of rotational stop information as shown in FIG. 13, and angle information with 9 bits, based on rotational stop information and angle information applied from the angle information generator 120. Then, as set forth above, the communication control circuit 121 transmits the resulting bit string to the rotational information computing section 200, provided in the engine control unit 300, by one bit in synchronism with the clock pulses. Also, with the present embodiment, it is configured such that the rotational stop flag F is reset to "0" under a rotating condition of the crankshaft CS and set to "1" when the crankshaft CS remains halted.

When receiving the count signal from the communication control circuit 210 by which these angle information are received, the rotational position computing section 200 increments the angle counter AC under a condition where the value of the stored rotational stop flag F remains at "0". That is, the computing unit 220 does not increment the angle counter AC in a case where judgment is made that the rotational information transmitter 100 remains under time synchronizing communication.

Further, upon receipt of a receiving complete signal from the communication control circuit 210 when completing the receiving of angle information, the computing unit 220 reads in the value of the rotational stop flag F from among angle information. Then, the computing unit 220 checks and corrects the angle counter AC depending on the value of the read rotational stop flag.

Figure 14:
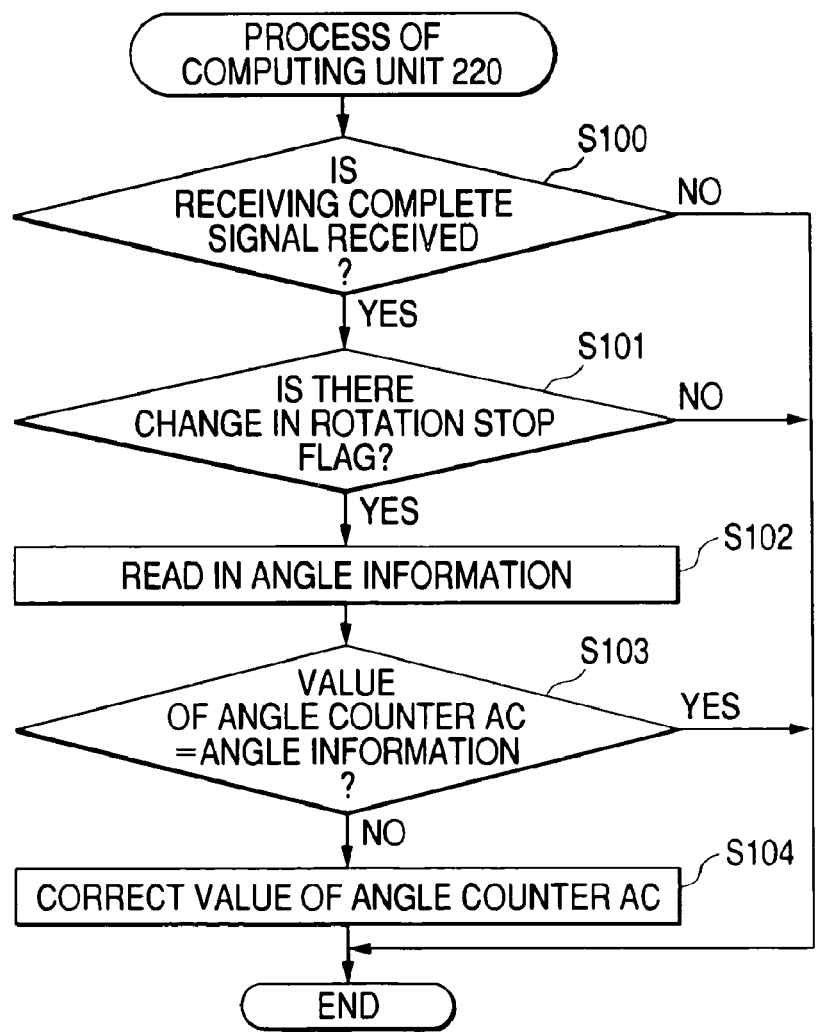
FIG. 14 is a flowchart showing a basic sequence of operations of the computing unit related to the second embodiment.

That is, as shown in FIG. 14, operation is initially executed in step S100 to make judgment to find whether or not the communication control circuit 210 is applied with the receiving complete signal. If the result is judged to be "YES", then, operation is executed in step S101 to read in information of the rotational stop flag F from among angle information received by the communication control circuit 210. Subsequently, judgment is made to find whether the value of the rotational stop flag F varies from "0" to "1" or from "1" to "0". That is, judgment is made to find whether the rotational information transmitter 100 shifts the operation from angle synchronizing communication to time synchronizing operation or from time synchronizing operation to angle synchronizing communication. If judgment is made in step S101 to be "NO", then, the relevant operation is interrupted once.

On the contrary, if the operation in step S101 has a result with "YES", then, the operation is executed in step S102 to read in a whole of angle information delivered from the communication control circuit 210. Subsequently, the operation is executed in succeeding step S103 to make judgment to find whether or not a count value of the angle counter AC and a value, represented by angle information being read in, corresponds to each other. If judgment is made to be "NO", then, the operation is executed in step S104 to correct the count value of the angle counter AC to the value represented by angle information, upon which the relevant operation is interrupted once. Moreover, if the operations are executed in step S100, S101 or S103 in results with "NO", the operation is interrupted once.

Thus, the count value of the angle counter AC is corrected depending on the value represented by received angle information when the rotational information transmitter 100 shifts the operation from angle synchronizing communication to time synchronizing operation or the operation from time synchronizing operation to angle synchronizing communication. Hereunder, detailed description is made of behaviors, indicated by the count value of the angle counter AC, appearing during correction of the angle counter AC with reference to FIGS. 15(a) to (d) and 16(a) to (d).

FIGS. 15(a) to (d) show behaviors of the angle counter AC, appearing when the rotational information transmitter 100 shifts the operation from angle synchronizing communication to time synchronizing operation, in terms of angle information and clock pulses being received.

As shown in FIGS. 15(a) to (d), suppose the rotational information transmitter 100 shifts the operation from angle synchronizing communication to time synchronizing operation, the communication control circuit 210 receives angle information with the rotational stop flag having a value with "1". Therefore, the computing unit 220 increments the angle counter AC depending on a count signal applied from the communication control circuit 210. In an example shown in FIG. 15(d), the angle counter AC takes a count value of "12" changed from "11".

Further, upon completing the receiving of angle information with the communication control circuit 210, the computing unit 220 is applied with a receiving complete signal. Upon receipt of the receiving complete signal, the computing unit 220 reads in a value of the rotational stop flag F from among received angle information.

As a result, the computing unit 220 recognizes the presence of the rotational stop flag F whose value shifts from "0" to "1", thereby permitting the angle counter AC to be corrected through the operation to read in a whole of angle information. In an example shown in FIG. 15 (d), since received angle information takes a value of "11° CA", the count value of the angle counter AC is corrected downward from "12" to "11". In such a way, even if a starting edge of angle information (clock pulse) is erroneously counted, recognizing that the value of the angle counter AC is shifted from "0" to "1" allows the computing unit 220 to correct the count value of the angle counter AC to the value represented by angle information.

That is, even if the crankshaft CS remains halted, an absolute angle of the relevant rotational angle (stop angle) θ can be recognized.

Further, FIGS. 16(a) to (d) show behaviors of the angle counter AC, appearing when the rotational information transmitter 100 restores the operation from time synchronizing operation to angle synchronizing communication, in terms of received angle information and clock pulses.

As shown in FIGS. 16(a) to (d), suppose the rotational information transmitter 100 shifts the operation from time synchronizing operation to angle synchronizing communication, the communication control circuit 210 receives angle information whose rotational stop flag has a value with "0". However, with the computing unit 220, since a value of the angle counter AC still remains in a value is of "1" at a timing when the count signal is applied from the communication control circuit 210, the angle counter AC is not incremented. In an example shown in FIG. 16(d), even if the starting edge of angle information (clock pulse) is detected with the communication control circuit 210, the count value of the angle counter AC still remains intact in the value of "11".

Further, upon completing the receiving of angle information with the communication control circuit 210, the computing unit 220 is applied with a receiving complete signal. Upon receipt of the receiving complete signal, the computing unit 220 reads in a value of the rotational stop flag F from among received angle information as shown at a timing t21 in FIG. 16(d).

As a result, the computing unit 220 recognizes the presence of the rotational stop flag F whose value shifts from "1" to "0", thereby permitting the angle counter AC to be corrected through the operation to read in a whole of angle information. In an example shown in FIG. 16 (d), since received angle information takes a value of "12° CA", the count value of the angle counter AC is corrected downward from "11" to "12". Also, since the rotational stop flag F takes a value of "0" in a stage subsequent to the timing t21, the computing unit 220 increments the angle counter AC when the communication control circuit 210 receives angle information (clock pulse) in a subsequent stage. For instance, in an example shown in FIGS. 16(a) to (d), upon operation of the communication control circuit 210 to receive angle information representing a value of "13° CA", the computing unit 220 allows the angle counter AC to increment from "12" to "13" in response to the count signal.

Thus, even if the crankshaft CS (magnetized rotor 111) takes a shift from a rotating status to a halted status or from the halted status to the rotating status, the value of the angle counter AC is properly corrected, enabling a restart of detecting the rotational angle .theta. of the crankshaft CS in a smooth fashion. Also, since the transmission interval Z, like that of the first embodiment set forth above, can be withdrawn from consideration, it becomes possible to shorten the transmission cycle of angle information in a given range (for instance, from Z=100 ms to Z=4 ms) during time synchronizing communication as shown, for instance, in FIG. 15(a) to (d).

However, a need arises for correcting the count value of the angle counter AC downward when a shift occurs from angle synchronizing communication to time synchronizing communication. In this concern, the use of a method, described below, which is implemented in combination between the first and second embodiments results in no need for performing upward correction or downward correction per se, mentioned above, depending on the shift in communication modes.

That is, the present embodiment has the threshold time interval Y (of, for instance, 30 ms) like the first embodiment set forth above and the operation is interrupted to increment the angle counter AC even if the rotational stop flag F has a value with "0" under circumstances where the count value of the angle counter AC exceeds the threshold time interval Y as shown in FIGS. 17(*a*) to (*d*).

By so doing, for instance, even if angle information is received at a timing t31 after an elapse of the threshold time interval X (of, for instance, 50 ms) upon receiving preceding angle information with a shift in operation of the rotational information transmitter 100 from angle synchronizing communication to time synchronizing communication, the count value of the angle counter AC exceeds the threshold time interval Y with no operation in counting up the angle counter AC. That is, no downward correction, mentioned above, of the angle counter AC is executed. Also, the angle counter AC is corrected, when the rotational information transmitter 100 restores the operation from time synchronizing communication to angle synchronizing communication, depending on a shift from "1" to "0" in the value of the angle counter AC as mentioned above.

Accordingly, with such a structure, the transmission cycle of angle information can be shortened during the time synchronizing communication and no probability occurs in the rotational position computing section 200 to erroneously count a starting edge of initial angle information (clock pulse).

As set forth above, the rotation detection device of the present embodiment is able to obtain advantageous effects in a manner described below.

(8) The rotational information transmitter 100 is configured to allow created angle information to be added with the stop flag F with "1" for transmission and the computing unit 220 is configured to interrupt counting operation of the angle counter AC in an event that the rotational stop flag has the value with "1". Therefore, the transmission interval Z in the first embodiment can be withdrawn from consideration, resulting in a capability of shortening a communication interval during the time synchronizing communication.

(9) Further, to take a single example, the present invention may be implemented in a combination between the first and second embodiments, set forth above, to have a structure wherein the presence of a shift to the time synchronizing communication is judged based on the count value of the edge interval counter EC exceeding the threshold time interval Y. This enables the transmission cycle of angle information during the time synchronizing communication to be shortened, resulting in a capability of addressing disadvantage caused in the rotational information computing section 200 to erroneously count the starting edge of initial angle information (clock pulse).

Third Embodiment

Now, description will now be made of a position detecting device of a third embodiment according to the present invention.

With the first and second embodiments set forth above, angle information are transmitted from the rotational information transmitter 100 each for "1° CA" and angular resolution of angle information is fixed to a value of "1° CA". In contrast, the rotation detection device of the present embodiment takes the form of a structure wherein the angular resolution of angle information is made variable depending on a rotational speed of the crankshaft CS. Such a rotation detection device with such a structure is described below. Also, the operations are executed to check and correct the count value of the angle counter AC in the same sequence as those in the first and second embodiments.

Figure 19:
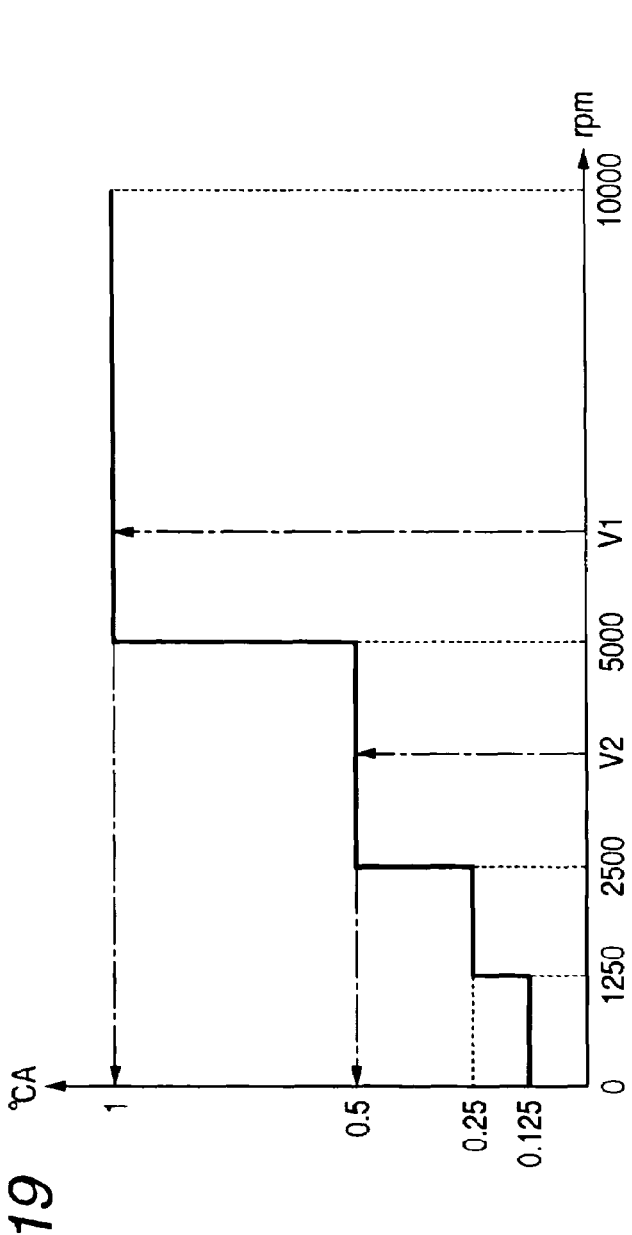
FIG. 19 is a typical view showing a map incorporated in an angle information generator of the rotation detection device of the third embodiment.

In order to make it possible to alter the resolution of angle information depending on the rotational speed of the crankshaft CS in such a way, the angle information generator 120 incorporates a non-volatile memory that preliminarily stores a map shown in FIG. 19. This map represents the relationship between the rotational speed of the crankshaft CS and the resolution of angle information available to be transmitted at each rotational speed and is set such that the higher the rotational speed of the crankshaft CS, the lower will be the resolution, that is, the lower the rotational speed, the greater will be the subdivision on the basis of a fact with a difficulty in ensuring a time interval on communication of angle information when the rotation of the crankshaft CS reaches a high speed.

Incidentally, with the present embodiment, there are four resolutions set in "1° CA" increments, "0.5° CA" increments, "0.25° CA" increments and "0.125° CA" increments. However, numeric values and the number of angular resolutions are not necessarily limited to these four values and may be arbitrarily set depending on communicating ability of the rotational information transmitter 100 or angular resolution required for performing engine control.

The angle information generator 120 further operates to acquire a rotational speed of the crankshaft CS based on variation in the rotational angle θ, per unit time, of the crankshaft CS being detected while obtaining angular resolution of angle information, to be transmitted at such a rotational speed, using the map set forth above. Then, the angle information generator 120 outputs synthesized angle information and angle information, indicative of such angular resolution, to the communication control circuit 121 for each unit volume (rotational angle θ) that represents such angular resolution.

Thus, the rotational information transmitter 100 is able to alter angular resolution of angle information in accordance with the rotational speed of the crankshaft CS. The flow of a process for altering such angular resolution is further described below in detail with reference to FIGS. 19 and 20(*a*) to (*b*).

Figure 20:
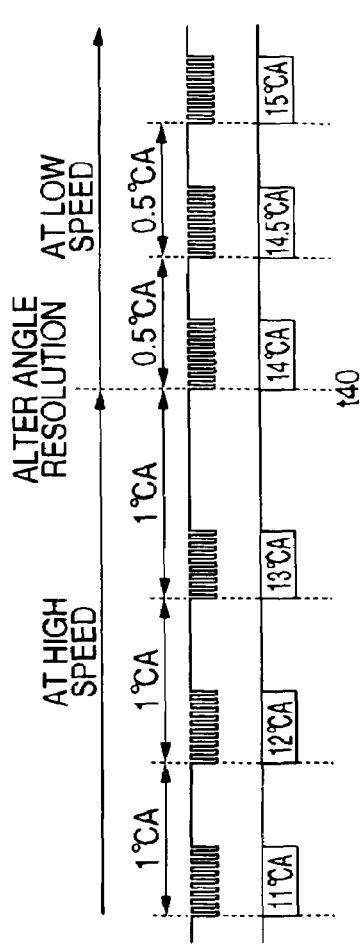
FIG. 20(a to b) shows timing charts representing modes of a train of clock pulses and angle information, associated with variation in a rotational speed of a crankshaft, in the rotational information transmitter of the third embodiment.

Now, suppose the crankshaft CS is rotating at a speed V1 (of, for instance, 6000 rpm) as shown in FIG. 19. In this case, using the map shown in FIG. 19, angular resolution of angle information for transmission at the speed V1 is derived to be "1.degree. CA". Consequently, as shown in FIG. 20(*a*) to (*b*), the angle information generator 120 transmits angle information, added with resolution information indicative of angular resolution with "1.degree. CA", to the communication control circuit 121 for "1.degree. CA". In the meanwhile, suppose the rotational speed of the crankshaft CS drops from the speed V1 to a speed V2 (of, for instance, 4000 rpm), as shown in FIG. 19, at a timing designated by, for instance, a timing t40. In this case, since angular resolution at the speed V2 takes a value of "0.5.degree. CA" as derived from the map shown in FIG. 19, the angle information generator 120 transmits angle information, added with resolution information indicative of angular resolution with "0.5.degree. CA", to the communication control circuit 121 for "0.5.degree. CA".

With the rotational information transmitter 100, the communication control circuit 121 forms bit strings each composed of, for instance, 15 bits as shown in FIG. 18 based on angle information applied from the angle information generator 120 in such a way described above. As shown in FIG. 18, with the present embodiment, in addition to angle information with 8 bits, exemplified in the first and second embodiments set forth above, a bit string, added with resolution information with 2 bits representing the four angular resolutions set forth above, is formed. Among these, resolution information represents the contents, depending on combinations of respective bits, in a manner listed below.

(0, 0): Angular Resolution in "1° CA" Increments.
(0, 1): Angular Resolution in "0.5° CA" Increments.
(1, 0): Angular Resolution in "0.25° CA" Increments.
(1, 1): Angular Resolution in "0.125° CA" Increments.

Further, in creating the bit string, angle information is initially stored from the most significant bit (MSB). That is, in case of resolution in, for instance, "1° CA" increments, angle information is stored in areas with 6 bits to 14 bits and, in case of resolution in "0.5° CA" increments, angle information is stored in areas with 5 bits to 14 bits. Even in cases of resolution in "0.25° CA" increments and resolution in "0.125° CA" increments, pieces of angle information are stored according to such a process.

While with angle information shown in FIG. 18, a data area in a bit "2" remains in non-use, such an area may be used as an area for storing the rotational stop flag F employed in the second embodiment set forth above for checking and correcting the count value of the angle counter AC according to the process described in the second embodiment mentioned above. Moreover, when rendering such an area to remain in non-use, angle information may have an entire data length that is shortened upon taking up a component of 1 bit. In this case, the count value of the angle counter AC can be corrected according to the process mentioned in conjunction with the first embodiment. Then, upon the formation of the bit string composed of angle information and resolution information, the bit string is transmitted from the communication control circuit 121 to the rotational position computing section 200, provided in the engine control unit 300, in synchronism with the train of clock pulses by 1 bit in the same manner as those of the first and second embodiments.

On the other hand, with the computing unit 220 of the rotational position computing section 200, resolution information, delivered from the communication control circuit 210, is read in each time angle information (clock pulse) is received, thereby counting up the angle counter AC in step designated by resolution information when the count signal, indicative of a starting edge of angle information (clock pulse) is received at a subsequent timing.

For instance, upon receipt of angle information (clock pulse) in a mode shown in FIGS. 20(*a*) to (*b*) after which recognition is made from the resulting resolution information that angle information has angular resolution in "1.degree. CA" increments, the computing unit 220 increments the angle counter AC by a magnitude corresponding to angular resolution in "1.degree. CA" increments when a starting edge of angle information (clock pulse) is subsequently detected. Moreover, in cases where angle information (clock pulse) is received at a timing indicated at the timing t40, as shown, for instance, in FIGS. 20(*a*) to (*b*), and the resulting angle information has angular resolution in "0.5..degree. CA" increments, the computing unit 220 increments the angle counter AC by a magnitude corresponding to angular resolution in "0.5.degree. CA" increments. Therefore, the computing unit 220 is able to increment the angle counter AC depending on angular resolution of received angle information and properly grasp the rotational angle (halted angle) .theta. of the crankshaft CS.

As set forth above, the rotation detection device of the present embodiment is able to newly obtain advantageous effects as described below.

(10) The rotational information transmitter 100 is configured such that the lower the rotational speed of the crankshaft CS (clock pulse), the smaller will be the subdivision of angular resolution bearing a timing at which angle information is transmitted, that is, the higher will be the resolution. Therefore, angular resolution varies such that the lower the rotational speed of the crankshaft CS, the higher will be the resolution of angle information whereby even when executing operation such as, for instance, engine control, the rotation of the crankshaft CS can be controlled with high angular precision during rotation of the crankshaft CS at a low speed.

(11) Further, the rotational information transmitter 100 is formed in a structure wherein resolution information, indicative of angular resolution of angle information is transmitted with angle information to the rotational position computing section 200 (computing unit 220). Therefore, the rotational position computing section 200 is enabled to accurately grasp a change in angular resolution of the rotational information transmitter 100.

Fourth Embodiment

Next, description will now be made of a fourth embodiment concretizing a rotation detection device according to the present invention.

The present embodiment differs from the first to third embodiments in respect of modes of signals representing clock pulses and angle information. That is, although the first to third embodiments have been described above with reference to the structures wherein the clock pulses and angle information are separately transmitted from the communication control circuit 121, the present embodiment is configured to allow a mixture signal, composed of the clock pulses and angle information, to be transmitted from the rotational information transmitter 100. Hereunder, such a rotation detection device is described below.

Figure 21:
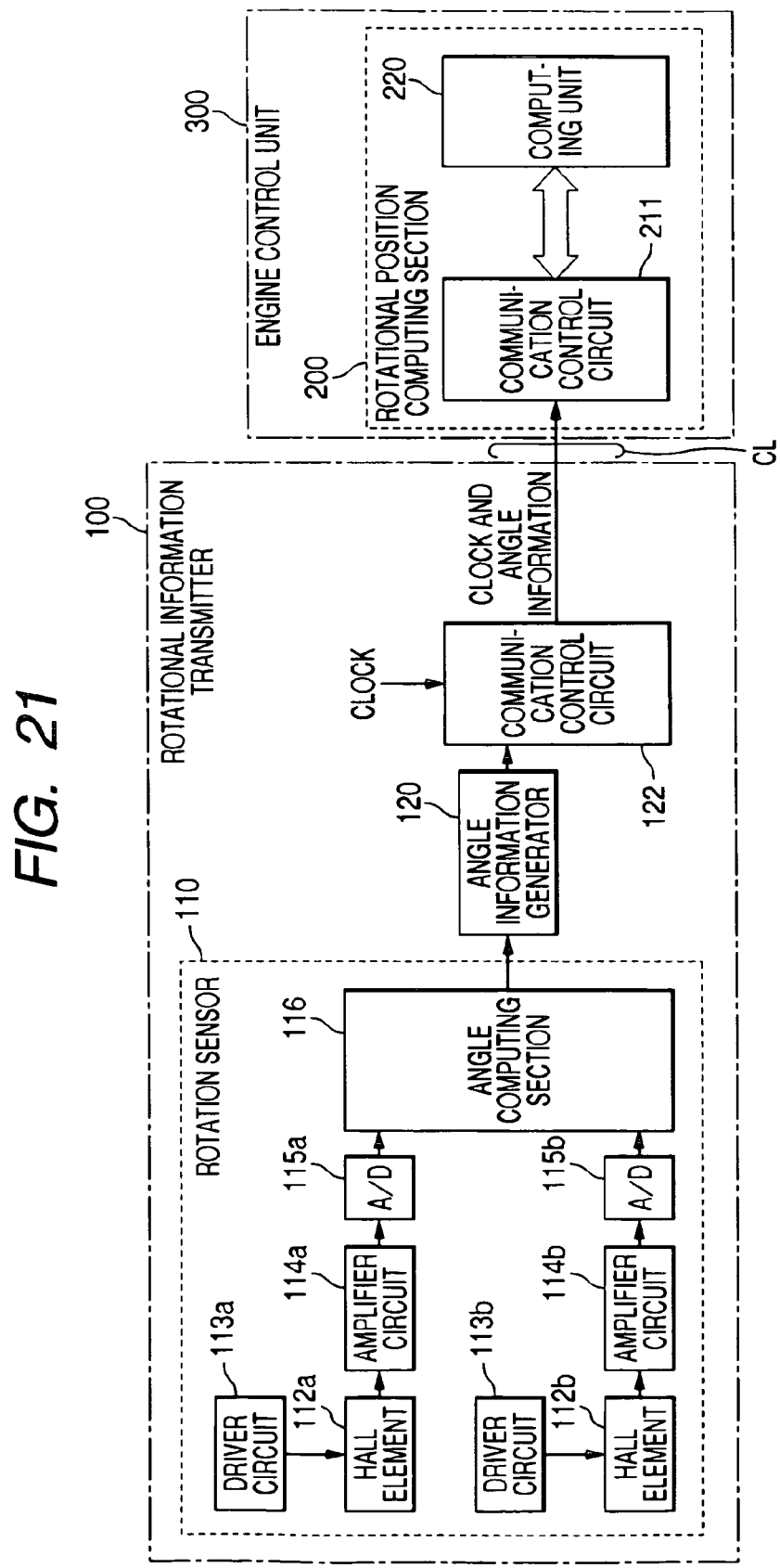
FIG. 21 is a block diagram showing an outline of a structure of the fourth embodiment.

FIG. 21 is a block diagram showing an outline of a structure of the rotation detection device of the present embodiment. The rotation detection device of the present embodiment is structured to include communication control circuits 122, 211 in place of the communication control circuits 121, 210 of the first to third embodiments. Also, the same component parts as those of the first to third embodiments bear like reference numerals to omit detailed description of the same.

Among these, the communication control circuit 122 is applied with angle information from the angle information generator 120 and mixes this angle information with clock pulses to form a three-valued signal (mixture signal: see FIG. 23) with three potential states in a high potential, a medium potential and a low potential. Then, the communication control circuit 122 transmits the resulting mixture signal to the rotational position computing section 200.

Figure 22:
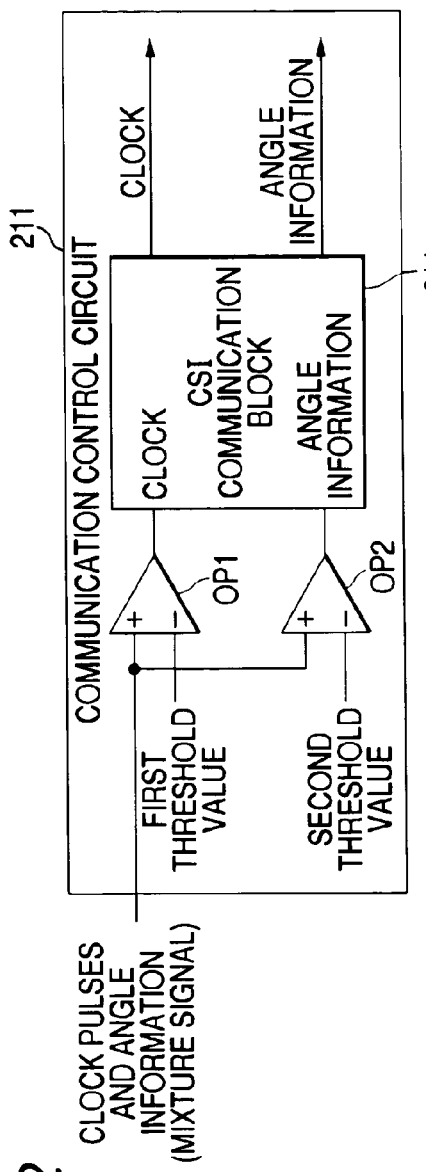
FIG. 22 is a block diagram schematically showing a structure of a communication control circuit of the rotation detection device of the fourth embodiment.

Further, the communication control circuit 211 has a structure comprised of comparators OP1 and OP2 applied with the mixture signal being received and an OSI communication block 211*a* applied with output signals from the comparators OP1 and OP2, as shown in FIG. 22.

Figure 23:
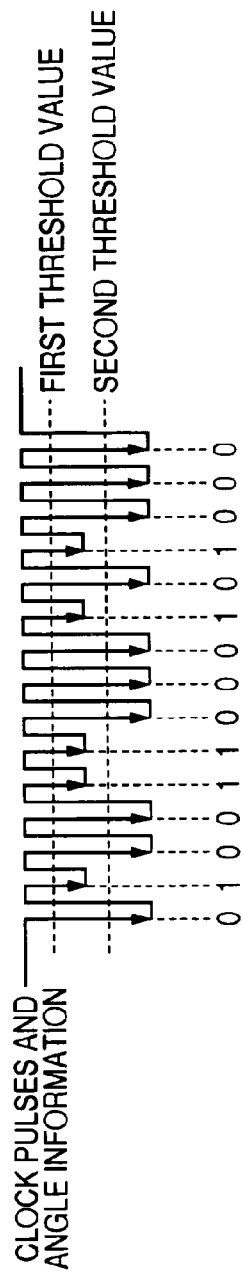
FIG. 23 is a typical view showing a mixture signal to be transmitted from the rotation detection device of the fourth embodiment.

Among these, the comparator OP1 makes comparison between the inputted mixture signal and a first threshold value, outputting a voltage value in a logic level with "H (High)" when the mixture signal exceeds the first threshold value and another voltage value in a logic level with "L (Low)" when the mixture signal is less than the first threshold value. As shown in FIG. 23, the first threshold value is set to lie in a voltage level, enabling detection of the clock pulses, that is, a voltage level intermediate between the high and low potentials in the present embodiment.

Likewise, the comparator OP2 makes comparison between the inputted mixture signal and a second threshold value, outputting a voltage value in a logic level with "H (High)" when the mixture signal exceeds the second threshold value and another voltage value in a logic level with "L (Low)" when the mixture signal is less than the second threshold value. As shown in FIG. 23, the second threshold value is set to lie in a voltage level, enabling detection of angle information, that is, a voltage level intermediate between the medium and low potentials in the present embodiment.

Further, the CSI communication block 211a of the communication control circuit 211 restores the clock pulses and angle information depending on these voltage levels inputted from the comparators OP1 and OP2.

The operation of the communication control circuit 211, appearing after the mixture signal, composed of the clock pulses and angle information, has been separated, is executed in the same way as those of the first to third embodiments such that each time these angle information are received, a count signal is applied to the computing unit 220 in synchronism with an initial rising edge of the clock pulses. Also, the communication control circuit 211 serves to output stored angle information to the computing unit 220 in response to a request from the computing unit 220.

In the meanwhile, the computing unit 220 of the rotational position computing section 200 includes, in addition to the angle counter AC, a bit counter BC. With the present embodiment, the bit counter BC is structured in 14 bits such that each time the counter is counted up, a bit, corresponding to the resulting count value, is set to "1". Moreover, the bit counter BC also plays a role as a ring counter that operates such that when a rising edge of the clock pulse is detected after all of 14 bits are set to "1", all of the bits are reset to "0". That is, when the count value of the bit counter BC corresponds to the bit numbers of angle information transmitted from the rotational information transmitter 100, the bit counter BC is initialized.

Figure 24:
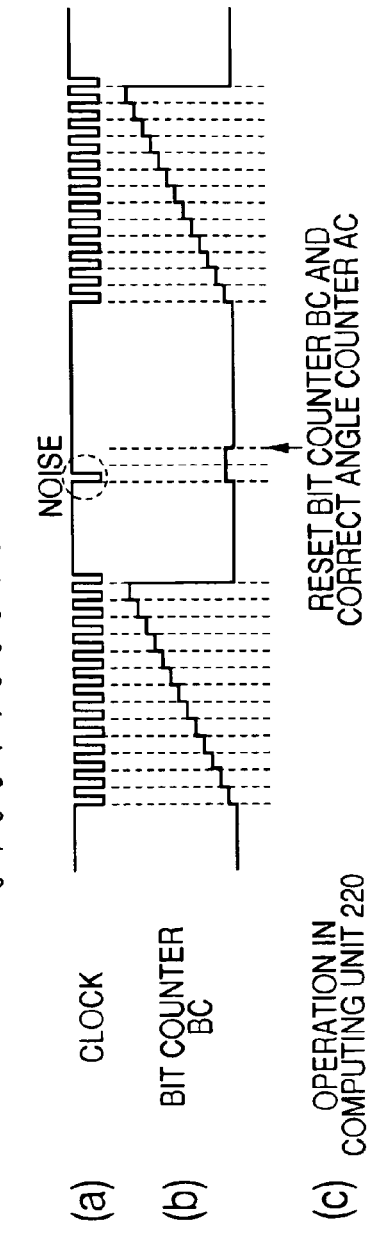
FIG. 24(a to c) shows timing charts, representing behavior of a bit counter, operative upon receipt of a train of clock pulses, and operation to be executed by the computing unit depending on behavior of the bit counter, of the rotation detection device of the fourth embodiment.

The computing unit 220 allows the angle counter AC to count a starting edge of the clock pulse in the same manner as those of first to third embodiments set forth above while using the bit counter BC to count respective rising edges of the clock pulses as shown in FIG. 24 (a) to (c).

In addition, the computing unit 220 monitors behavior of a count value of the bit counter BC upon which if the rising edges of the clock pulses in consecutive 15 bits are not detected, that is, when a vacancy occurs in the clock pulses by a value greater than two clock pulses before the count value reaches the bit number of angle information transmitted from the rotational information transmitter 100, the bit counter BC is initialized. Then, the computing unit 220 corrects the count value of the angle counter AC to the count value of the angle counter AC in the absence of the clock pulses. Executing such operation of the computing unit 220 addresses erroneous counting of the starting edge resulting from noises got mixed in a communication system.

Next, detailed description is made of the relationship between behavior of the bit counter and the count value of the angle counter AC with reference to FIGS. 24(a) to (c).

As shown in FIG. 24(b), the computing unit 220 allows the bit counter BC to increment in synchronism with each rising edge of the clock pulses as set forth above. As set forth above, the bit counter BC is initialized at a time point when a rising edge at a 15-bit of the clock pulses as set forth above.

Now, suppose noise get mixed in a line of clock pulses as shown by an area, circled in dotted line, in FIG. 24(a), the rising edge of the noise causes the bit counter BC and the angle counter AC to increment. However, no probability occurs for a subsequent rising edge to be detected in the presence of noise, causing the occurrence of a vacancy with a value greater than two clock pulses of the clock pulses before the count value of the bit counter BC reaches 15 bits of the bit number of angle information. Therefore, the computing unit 220 resets the bit counter BC, while correcting the angle counter AC to an appropriate count value, that is, a count value resulting from subtraction by "1" in a pattern to cancel the counting due to the rising edge of the clock pulse mentioned above. This results in ability of effectively preventing bit deviation when reading angle information due to noise.

As set forth above, the rotation detection device of the present embodiment is able to newly obtain advantageous effects as described below.

(12) It is structured such that the clock pulses and angle information are transmitted from the rotational information transmitter 100 in an identical signal (mixture signal). This results in a capability of deleting a signal line between the rotational information transmitter 100 and the engine control unit 300.

(13) Further, the bit counter BC takes the form of a structure that is initialized under a logical sum condition between the presence of correspondence between the count value and angle information, transmitted from the rotational information transmitter 100, and the occurrence of a vacancy of the clock pulses in a value greater than two clock pulses before the count value reaches the bit number of angle information transmitted from the rotational information transmitter 100. Therefore, monitoring behavior of the bit counter BC enables noise, got mixed in the communication system, to be easily discriminated, thus making it easy to correct the erroneous counting of the computing unit 220 resulting from such disturbance.

Fifth Embodiment

Now, a fifth embodiment concretizing a position detecting device according to the present invention will now be described below.

While with the first to third embodiments, the rotational information transmitter 100 converts angle information, indicative of the rotational angle θ of the crankshaft CS, to the bit string to allow the bit string to be transmitted in synchronism with the clock pulses, the present embodiment allow this angle information to be modified in pulse width, in place of converting the angle information to the bit string, for transmission.

That is, the present embodiment differs from the first to fourth embodiments in that communication is established between the rotational information transmitter 100 and the rotational position computing section 200 using a pulse signal modified in pulse width. Hereunder, such a rotation detection device is described. Also, even with the present embodiment, operations are executed to appropriately check and correct the count value of the angle counter AC in the same sequence as those of the first to fourth embodiments set forth above.

Figure 25:
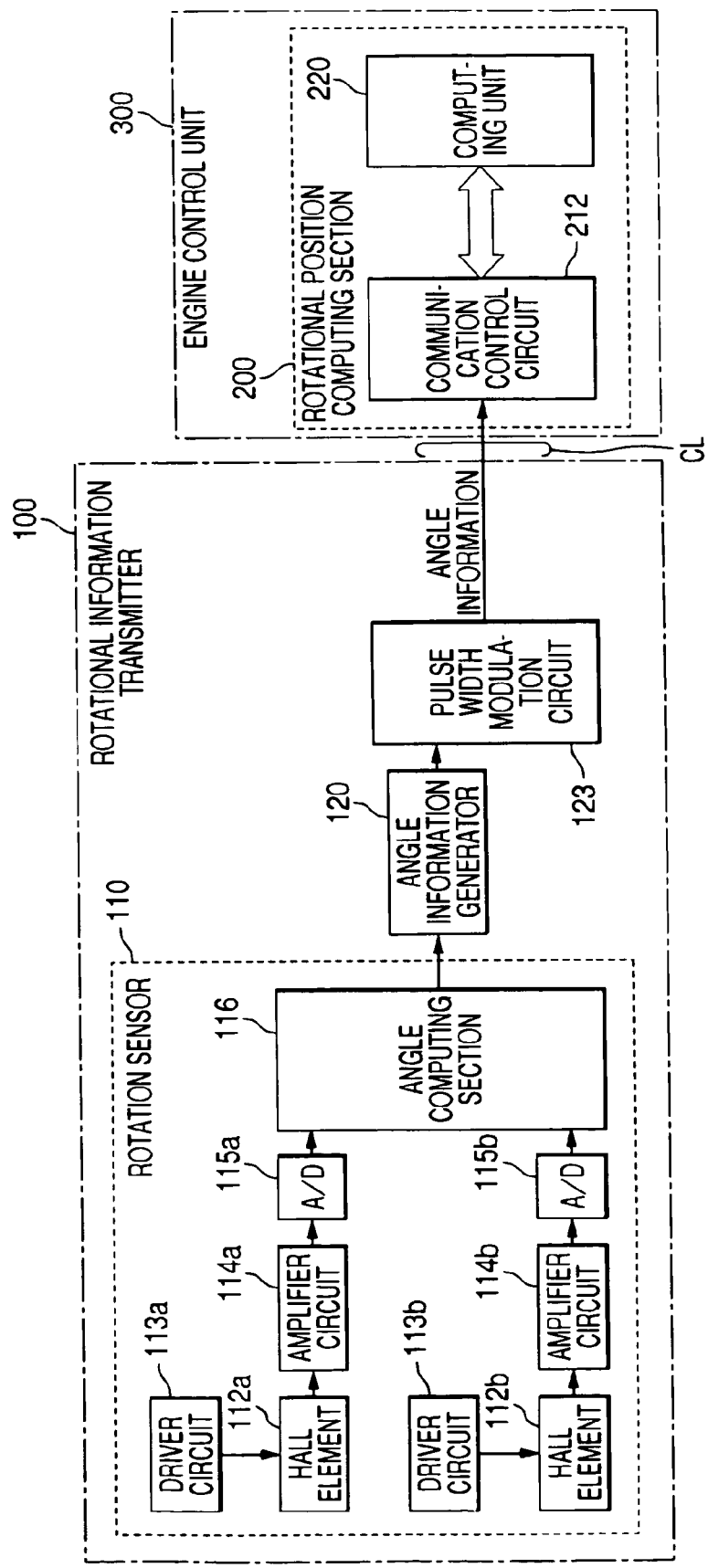
FIG. 25 is a block diagram showing an outline of a structure of the fifth embodiment.

FIG. 25 is a block diagram showing an outline of a structure of a rotation detection device of the present embodiment. As shown in FIG. 25, the rotational information transmitter 100 of the present embodiment is structured to have a pulse width modulation circuit 123 in place of the communication control circuit 121 of the first to third embodiment or the communication control circuit 122 of the fourth embodiment. Moreover, the rotational position computing section 200 of the present embodiment is structured to have a communication control circuit 212 in place of the communication control circuit 210 of the first to third embodiment or the communication control circuit 211 of the fourth embodiment.

Among these component parts, the pulse width modulation circuit 123 executes pulse width modulation so as to allow angle information, inputted from the angle information generator 120, to have a pulse width directly associated with the magnitude of the rotational angle θ represented by angle information, transmitting the resulting modulated pulse width to the rotational position computing section 200 provided in the engine control unit 300.

The pulse width of such a modulated pulse signal takes a unique value within one turn (36.degree. CA) of the crankshaft CS. For instance, as shown in FIGS. 26(a) to (b), suppose the pulse width of the pulse signal, representing "359.degree. CA", is set to a value of 3.6 ms, there is a pulse width of a pulse signal in which 0.01 ms, resulting from 3.6 ms divided by 360, represents "1.degree. CA". That is, the rotational information transmitter 100 transmits a pulse signal whose pulse width varies by 0.01 ms each time the crankshaft CS rotates at an angle of "1.degree. CA".

On the other hand, with the rotational position computing section 200, the communication control circuit 212 detects a rising edge (starting edge) whenever the pulse signal, mentioned above, is received to apply a count signal to the computing unit 220 while measuring pulse width of the pulse signal to temporarily store information, representing the relevant pulse width, that is angle information in a register or the like. Then, the communication control circuit 212 serves to output stored angle information to the computing unit 220 in response to a request from the computing unit 220.

Also, the computing unit 220 increments the internal angle counter AC in the same manner as those of the first to fourth embodiments whenever the count signal is applied from the communication control circuit 212, while delivering transfer requests of angle information, mentioned above, to the communication control circuit 212 at timings required, respectively, during correction of the angle counter AC mentioned above.

By the way, a variety of modulation modes for pulse width modulation or modes of transmitting a pulse signal whose pulse width is modulated can be applied in the pulse width modulation circuit 123 set forth above. For instance, as shown in FIG. 27(a), the pulse signal may be configured to intermittently have a pulse width in direct correspondence to angle information each for "10° CA" and have a minimal pulse width (of, for instance, 0.01 ms) at other transmission timings.

Even with such a pulse signal, the computing unit 220 counts a rising edge of the pulse signal to enable the rotational angle (halted .theta. of the crankshaft CS to be appropriately recognized as shown in FIG. 27(b). Additionally, with such modulation mode or transmission mode for the pulse signal, the pulse width in direct correspondence to angle information mentioned above can be increased in an increased range, enabling the pulse widths to be measured in alleviated accuracy. Such modulation mode or transmission mode are particularly effective for use in confirming angle information on a regular basis as shown in FIG. 28(a) to (b).

Further, as shown in FIG. 27(a), the rotational angle θ, directly associated with angle information mentioned above, may be the rotational angle θ of the preceding rotational angle θ, playing a role as an index in engine control, as shown in FIG. 27(a) or the rotational angle θ per se that serves as the index mentioned above. In any of the modes, causing the computing unit 220 to count the rising edge of the received pulse signal enables the rotational angle θ of the crankshaft CS to be appropriately recognized.

As set forth above, the rotation detection device of the present embodiment is able to newly obtain advantageous effects as described below.

(14) The rotational position computing section 200 (computing unit 220) takes the form of a structure that counts the rising edge of the pulse signal transmitted from the rotational information transmitter 100 to obtain the rotational angle θ of the crankshaft CS. This enables the rotational angle θ of the crankshaft CS to be recognized without delay with no need for directly monitoring a rotary status of the crankshaft CS.

(15) The pulse width of the pulse signal, transmitted from the rotational information transmitter 100, is configured to have a unique value within one turn of the crankshaft CS and the computing unit 220 of the rotational position computing section 200 is formed in a structure that measures the pulse width of the received pulse signal for recognizing the rotational angle θ based on such a pulse width. This enables the rotational position computing section 200 to recognize an absolute angle of the crankshaft CS whereby the rotational angle θ of the crankshaft CS can be detected with high precision in a highly reliable manner unless no disturbance occurs in a communication system. Moreover, causing the pulse width of the pulse signal to take a unique value within one turn of the crankshaft CS in such a way results in a capability for a real rotational angle θ (absolute angle) to be provided at all times even if the rotational position computing unit 200 confirms the real rotational angle θ at any timing depending on the pulse width.

(16) Further, as one example, the rotational information transmitter 100 is configured such that the pulse width of the transmitted pulse signal takes a pulse width directly and intermittently associated with angle information for a given rotational angle θ of resulting angle information and at other transmission timings, the pulse width is modulated to a minimal pulse width. This results in a capability of enhancing a further increase in a variable range of the pulse width at an area in direct association with the relevant rotational angle θ. Accordingly, it becomes possible to alleviate the degree of precision of measuring the pulse width. That is, a precision of an input capture can be roughened, enabling the realization of a simplified structure of a section to measure the pulse width in the rotational position computing section 200.

Sixth Embodiment

Next, a sixth embodiment concretizing a rotation detection device according to the present invention will now be described below.

The present embodiment corresponds to a further improvement of the third embodiment described above and takes the form of a structure in which angular resolution of angle information, transmitted from the rotational information transmitter 100, is able to be commanded from the engine control unit 300. Hereunder, such a rotation detection device is described below.

Figure 29:
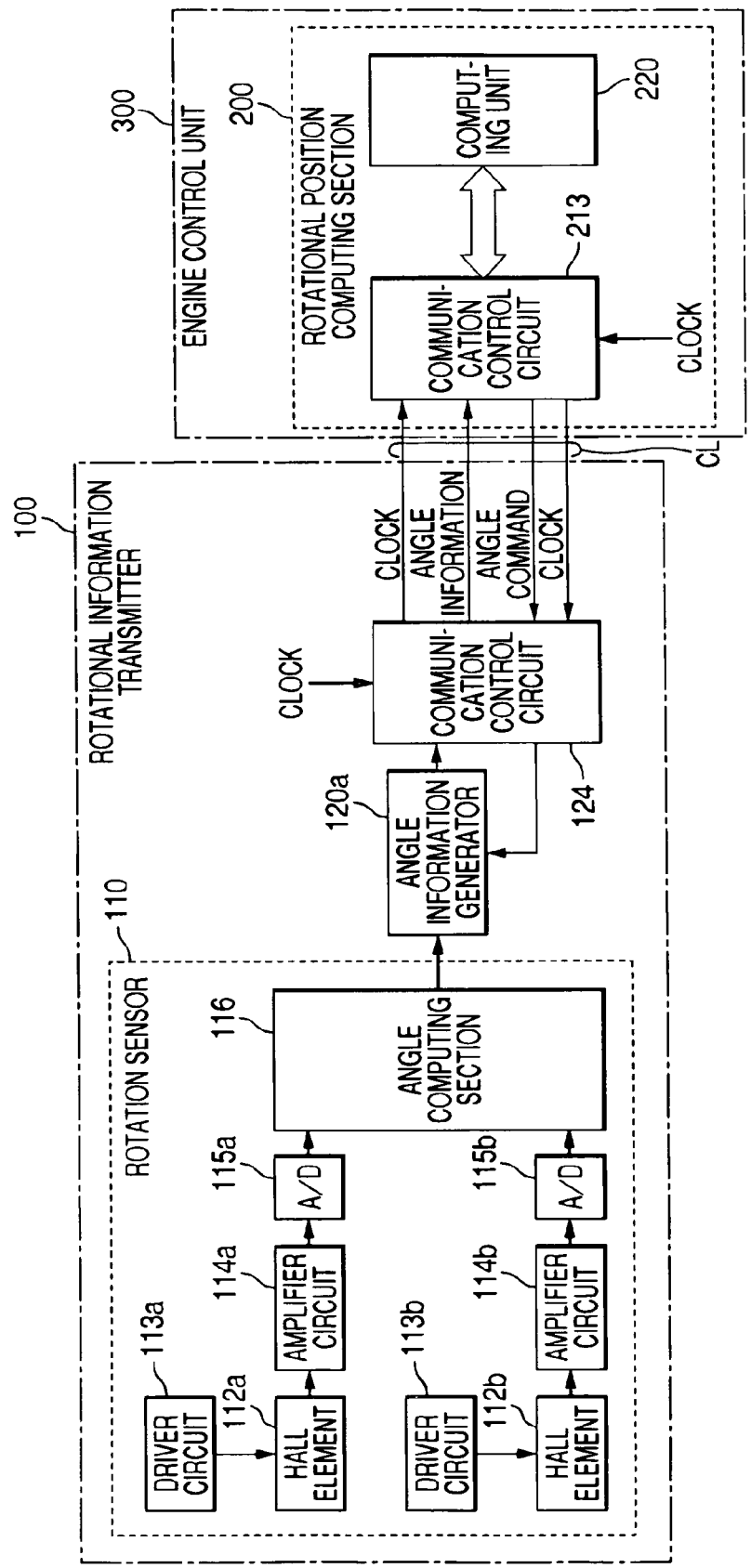
FIG. 29 is a block diagram showing an outline of a structure of the sixth embodiment.

FIG. 29 is a block diagram of an outline of a structure of a rotation detection device of the present embodiment. The rotational information transmitter 100 of the present embodiment has a structure that includes a communication control circuit 124 in place of the communication control circuit 121 of the third embodiment. In addition, the rotational position computing section 200 of the present embodiment has a structure that includes a communication control circuit 213 in place of the communication control circuit 210 of the third embodiment. Moreover, with the rotational position computing section 200, the computing unit 220 creates angular command information, indicative of desired angular resolution, for engine control to output the resulting angular command information to the communication control circuit 213.

Among these components, the communication control circuit 213 has, in addition to the structure of the communication control circuit 210 of the third embodiment set forth above, a transmission function for the rotational information transmitter 100. When applied with angular command information mentioned above from the computing unit 220, the communication control circuit 213 creates a bit string, composed of 2 bits, in response to such angular command information and the bit string is transmitted to the rotational information transmitter 100 in synchronism with a train of clock pulses by 1 bit.

The communication control circuit 213 may be configured to transmit angular command information, mentioned above, in synchronism with the train of clock pulses inputted from the rotational information transmitter 100. Also, the present embodiment incorporates four kinds of angular resolutions, required for engine control mentioned above, in "1° CA" increments, "0.5° CA" increments, "0.25° CA" increments and "0.125° CA" increments. Consequently, the bit number of angular command information takes 2 bits to enable the expression of these four kinds of angular resolutions.

On the other hand, the communication control circuit 124 of the rotational information transmitter 100 incorporates, in addition to a structure of the communication control circuit 121 of the third embodiment mentioned above, a receiving function operative to receive angular command information and the train of clock pulses, transmitted from the rotational position computing section 200. Upon receipt of angular command information and the train of clock pulses mentioned above, the communication control circuit 124 reads in angular command information using the clock pulses to allow read angular command information to be outputted to the angle information generator 120a.

The angle information generator 120a creates angle information in accordance with angular resolution represented by angular command information set forth above to allow the resulting angle information and resolution information, indicative of angular resolution, to be outputted. For instance, if angular resolution, indicative of angular command information, is represented by (0, 0), that is, there is angular resolution in "1° CA" increments, the angle information generator 120a initially creates angle information in "1° CA" increments to allow the resulting angle information to be outputted while outputting resolution information indicative of "1° CA".

Similarly, it becomes possible to employ timings, at which the angle information generator 120a alters angular resolution depending on angular command information transmitted from the rotational position computing section 200, which include:

(A) a timing, as shown at a timing t50 in FIGS. 30(a) to (d), at which angle information immediately after angular command information has been received;

(B) a timing, as shown at a timing t60 in FIGS. 31(a) to (d), at which angle information, to be transmitted after angular command information has been received, takes a value of "1° CA"; and (c) a timing, as shown at a timing t70 in FIGS. 32(a) to (d), at which angle information, to be transmitted after angular command information has been received, takes a value of "10° CA".

Also, with the timing (A), if angular command information is transmitted from the rotational position computing section 200, thereafter, the rotational information transmitter 100 executes operation to rapidly alter angular resolution. Also, with the timing (B), since it becomes possible to obtain necessarily adequate angle information in accordance with a control cycle of an engine, the presence of such angle information is effective when placing great importance on the control cycle of the engine. In addition, with the timing (C), there are many probabilities for engine control to be usually executed for every "10° CA", enabling the rotational information transmitter 100 to transmit angle information in match with the timing at which angle information is actually used.

As set forth above, the rotation detection device of the present embodiment is able to newly obtain advantageous effects described below.

(17) The rotation detection device is structured to allow the alteration of angular resolution of angle information transmitted from the rotational information transmitter 100 depending on angular command information transmitted from the rotational position computing section 200. Therefore, the rotational position computing section 200 is enabled to supply angle information, with angular resolution desired in engine control, to the engine control unit 300. Accordingly, the engine control unit 300 is able to recognize the rotational angle θ of the crankshaft CS with angular precision necessarily needed for engine control.

Seventh Embodiment

Next, description will now be made of a seventh embodiment concretizing a rotation detection device according to the present invention. The present embodiment is a modified form of the sixth embodiment mentioned above and differs from the sixth embodiment in that the magnitude of angular resolution of angle information transmitted from the rotational information transmitter 100 is limited by the angle information generator 120a. Hereunder, such a rotation detection device is described.

The angle information generator 120a, related to the present embodiment, has a structure that additionally includes a non-volatile memory and an interval measuring counter. As shown in FIG. 33(e), the memory preliminarily stores a threshold value (indicated by an alternate long and two short dashes line) representing a transmission cycle required for angle information to be transmitted with angular resolution in "1° CA" increments and another threshold value (indicated by an alternate long and short dash line) representing a transmission cycle required for angle information to be transmitted with angular resolution in "0.5° CA" increments. Moreover, the memory further stores the other threshold value (indicated by solid line) representing a transmission cycle required for angle information to be transmitted with angular resolution in "0.25° CA" increments.

The angle information generator 120a serves to measure the transmission cycle of angle information using the interval measuring counter IC while when applied with angular command information, initially judging which threshold value will be an object which a count value (measured value) of the interval measuring counter IC exceeds.

If judgment is made that angular resolution, represented by angular command information being inputted, is commanded to be less than the threshold value exceeding the count value of the interval measuring counter IC, the angle information generator 120a outputs angle information together with resolution information, indicative of angular resolution, to the communication control circuit 124 in accordance with angular resolution being commanded. In the meanwhile, upon receipt of an input related to a command with angular resolution associated with the threshold value which the count value of the interval measuring counter IC does not exceed, the angle information generator 120a allows angle information and resolution information, indicative of relevant angular resolution, to be outputted to the communication control circuit 124 in accordance with angular resolution represented by the threshold value which the count value of the interval measuring counter IC exceeds.

That is, the angle information generator 120a alters angular resolution, available to perform transmission in terms of timing, under circumstances where angle information with angular resolution, represented by angular command information, is unable to be transmitted in terms of timing, and resolution information, indicative of altered angle information, is added to angle information generated with relevant angular resolution to be outputted.

For instance, as shown in FIG. 33(a) to (e), suppose angular command information, indicative of angular resolution in "0.25° CA" increments after the rotational information transmitter 100 transmits angle information with "13° CA" increments. The resulting count value of the interval measuring counter IC exceeds the threshold value corresponding to angular resolution in "0.5° CA" increments but does not exceed a threshold time corresponding to angular resolution in "0.25° CA" increments.

That is, it is impossible for angle information with angular resolution in "0.25° CA" increments, represented by angular command information, to be transmitted with respect to timing. Therefore, the rotational information transmitter 100 creates angle information in accordance with angular resolution, corresponding to the threshold value which the count value of the interval measuring counter IC exceeds, that is, angular resolution in "0.5° CA" increments and transmits the same. Also, here, when angular command information indicative of angular resolutions in "1° CA" increments and "0.5° CA" increments is received, angle information is transmitted in accordance with angular resolution, commanded by resulting angular command information, depending on a fact that the count value of the interval measuring counter IC exceeds the threshold values corresponding to these angular resolutions. For this reason, even when the rotational position computing section 200 provides a command exceeding a limit of a transmission cycle of angle information delivered from the is rotational information transmitter 100, it becomes possible to appropriately preclude the occurrence of malfunction resulting from omissions in communication of angle information.

As set forth above, the rotation detection device of the present embodiment is able to newly have advantageous effects described below.

(18) The angle information generator 120a of the rotational information transmitter 100 is structured such that when transmission of angle information with angular resolution represented by angular command information becomes impossible in view of timing, angular resolution is altered to enable transmission of angle information in view of timing to allow resulting resolution information, indicative of altered angular resolution, to be added to angle information created by relevant angular resolution to be outputted. Therefore, even when the rotational position computing unit 200 delivers a command exceeding a limit of the transmission cycle of angle information delivered from the rotational information transmitter 100, the occurrence of malfunction caused by omission in communication of angle information can be appropriately prevented.

Other Embodiments

Also, the position detecting device according to the present invention is not limited to the embodiments set forth above and may be realized in, for instance, modes described below upon suitably modifying the embodiments.

While among the embodiments set forth above, the embodiment, in which angle information or angular command information are transmitted and received on serial communication in synchronism with a train of clock pulses, has been described in conjunction with a structure in which starting edges of the clock pulses are assigned to be starting edges of those information, those information per se available to be transmitted or received may be added with a bit, representing a specific logical value, which serves as a start bit. The use of such a bit string structure enables a receiver side to directly detect the starting edge of information.

Particularly, with the first and second embodiments set forth above, the computing unit 220, forming the rotational position computing section 200, is configured to read in angle information, received from the communication control circuit 210, in each communication to check a value of the angular counter AC while correcting the resulting value depending on needs during operation to execute time synchronizing communication in a halt of rotation of the crankshaft CS (magnetized rotor 111). In place of such a configuration, another structure may be provided wherein the angular counter AC directly writes a value, represented by angle information being read in, in each communication. Even with such a structure, it becomes possible to achieve matching of the angular counter AC during a shift in communication modes according to these respective embodiments.

The correction of the angular counter AC employing the bit counter BC, related to the fourth embodiment set forth above, may be suitably applied to the structures of the first to third, and sixth and seventh embodiments set forth above. That is, even with these embodiments, adopting the structure for monitoring behavior of the bit counter BC results in a capability of easily distinguishing noises got mixed in a communication system.

Further, in particular, the structure of the sixth or seventh embodiment may be suitably adopted in the structure of the fourth embodiment configured to modulate angle information with the clock pulses for transmission and further the structure of the fifth embodiment configured to execute pulse width modulation of angle information for transmission.

The respective embodiments, set forth above, employ the structures wherein hall voltages A, B, outputted from the two hall elements 112a, 112b playing a role as the rotation sensors 110 forming the rotational information transmitter 100, are quantized once after which variations in these hall voltages A, B, resulting from rotation of the magnetized rotor 111, are converted in linear motion characteristics. However, the rotation sensor 110 may take a variety of structures such as a structure wherein no hall voltages A, B are quantized and hall voltages A, B are converted in the linear motion characteristics mentioned above through analogue computation or a structure wherein the converted motion characteristics are quantized.

Further, magnetic detection elements, to be employed in the rotation sensor 110, are not limited to the hall elements described above and may suitably employ magneto-resistive elements or the like. An objective body, to be detected by these elements, is not limited to the magnetized rotor, exemplified in FIG. 2, and may take any arbitrary structural body. In addition, the present invention is not limited to a type in which rotation is detected through magnetic detection and may suitably employ other expedients such as, for instance, optical type or electrostatic type encoders or the like.

The rotation detection devices of the embodiments described above may be arbitrarily applied. That is, while the embodiments have made specific mention of cases where a rotational position (rotational angle) of the crankshaft, playing a role as an output shaft of the engine, is detected to allow detected angle information to be provided for engine control, the present invention may have applications to all of other structures of various machines involving machine tools or the like that continuously need to detect an absolute angle of a rotary body playing a role as a detection object.

Moreover, with the present invention, a detection object has no need to include a rotary body. That is, likewise, a device, operative to detect a motional position of, for instance, a linearly moving detection object, may be applied to a variety of machines involving machine tools or the like. Incidentally, such cases result in a structure wherein positional variation, resulting from motion of the detection object, is detected by a suitable sensor and, in such cases, the structure may fundamentally include:

(a) a positional information transmitter operative to create positional information of a detection object depending on positional variation resulting from motion of the detection object detected by a position sensor and transmit resulting positional information on a leading role every time the positional variation of the detection object reaches a given unit quantity; and (b) a motional position computing section playing a role as a slave device to receive transmitted positional information and count starting edges of these positional information to derive the motional position of the detection object. To some degree or another in information to be involved in communication, the above structure is able to have advantageous effects according to the respective embodiments set forth above. Also, under circumstances where positional information (inclusive angle information), dealt with the motional position computing section, is suffice to include relative positional information based on a certain specified position or where the motional position computing section is configured to have a function to convert such relative positional information to absolute positional information, no need arises for positional information, created and transmitted by a positional information transmitter, to necessarily include absolute positional information.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A device detecting a motional position of an object in motion, said device comprising:
    a first unit (i) repeatedly producing absolute positional information indicative of the motional position of the object in response to a change in the motional position of the object, the change reflecting therein a motion of the object and the positional information being pulsed information, and (ii) repeatedly transmitting the produced absolute positional information every time when the change in the motional position of the object reaches a given unit quantity of the change; and
    a second unit (i) repeatedly receiving the absolute positional information transmitted from the first unit and (ii) repeatedly calculating the motional position of the object based on a predetermined procedure including repeatedly counting a starting edge of the absolute positional information to be received wherein the second unit includes means for correcting the calculated motional position of the object on the basis of the absolute positional information.

2. The device according to claim 1, wherein the second unit includes:
    means for making a comparison between a first value and a second value as to whether there is a difference between the first and second values, the first value being indicated by the absolute positional information to be transmitted from the unit every time when the calculated motional position of the object reaches the second value corresponding to a given amount of the motion of the object, and
    means for, if the comparison reveals that there is the difference between the first and second values, correcting the motional position of the object to be calculated at the next time of the counting on the absolute positional information used for the comparison.

3. The device according to claim 1, wherein the object is a rotary object which provides a rotational motion and the absolute positional information provides different temporal shifts depending on speeds of the rotary object.

4. The device according to claim 1, comprising a communication line communicably connecting the first and second units, the absolute positional information being transmitted through the communication line as a row of pulses representing bits of the positional information.

5. A device detecting a motional position of an object in motion, comprising:
    a first unit (i) repeatedly producing positional information indicative of the motional position of the object in response to a change in the motional position of the object, the change reflecting therein a motion of the object and the positional information being pulsed information, and (ii) repeatedly transmitting the produced absolute positional information every time when the change in the motional position of the object reaches a given unit quantity of the change; and
    a second unit (i) repeatedly receiving the positional information transmitted from the first unit and (ii) repeatedly calculating the motional position of the object based on a predetermined procedure including repeatedly counting a starting edge of the positional information to be received, wherein the second unit includes means for transmitting, to the first unit, information indicating the given unit quantity of the change in the motional position of the object, and
    the first unit includes means for changing the unit quantity which is currently used in the first unit, depending on the information indicating the given unit quantity which has been received.

6. The device according to claim 5, wherein the first unit includes:
    means for determining whether or not the transmission of the positional information under the given unit quantity based on the received information indicating the given unit quantity is possible or not in timing,
    means for changing the unit quantity to a quantity which allows the positional information to be transmitted in timing, in cases where the determining means determines that the transmission is impossible in timing, and
    means for transmitting, to the second unit, the produced positional information to which information indicating the changed given unit quantity is attached.

7. The device according to claim 6, wherein the first unit includes:

means for measuring intervals at which the produced positional information is transmitted, and means for holding a plurality of thresholds each showing a tolerance level of the intervals, the thresholds being set such that the smaller the unit quantity of the change in the motional position of the object, the greater the plurality of thresholds, wherein the currently-used unit quantity changing means in the first unit is configured to change the unit quantity within a unit quantity corresponding to the largest one of thresholds exceeded by measured values of the intervals, in cases where the unit quantity is changed depending on the information from the second unit.

8. A device detecting a motional position of an object in motion, comprising:

a first unit (i) repeatedly producing positional information indicative of the motional position of the object in response to a change in the motional position of the object, the change reflecting therein a motion of the object and the positional information being pulsed information, and (ii) repeatedly transmitting the produced absolute positional information every time when the change in the motional position of the object reaches a given unit quantity of the change;

a second unit (i) repeatedly receiving the positional information transmitted from the first unit and (ii) repeatedly calculating the motional position of the object based on a predetermined procedure including repeatedly counting a starting edge of the positional information to be received; and a positional sensor placed to sense the change in the motional position of the object, the positional sensor being composed of a magnetic sensor equipped with a magnetism sensing element which senses, as an absolute value, the change in the motional position of the object through a conversion of a magnetic change, which is caused by the motion of the object, into a linear motional characteristic:

wherein the object is a magnetized rotor composed of N and S poles magnetized separately from each other;

the magnetic sensor comprises:

two hall elements serving as the magnetism sensing element and being disposed so as to output two sine curve voltages in response to rotation of the magnetized rotor, the two sine curve voltages having phases mutually shifted by 90 degrees from each other, and means for performing a conversion of $\theta=\tan^{-1}(A/B)$ serving as means for converting the magnetic change into the linear motional characteristic, wherein $\theta$ is a rotation angle of the magnetized rotor, A is an output voltage from one of the two hall elements and defined by $A=\sin\theta$, and B is an output voltage B from the other hall element and defined by $B=\cos\theta$; and the first unit includes means for using the converted rotation angle $\theta$ to calculate changes in angles for rotation angles of 360 degrees provided by the rotation of the magnetized rotor.

9. The device according to claim 8, wherein the magnetized rotor is attached to a crankshaft of an engine so that rotation angles of the magnetized rotor are detected by the magnetic sensor to provide, as the positional information, information indicative of respective rotation angles of the crankshaft, the rotation angles of the crankshaft being the motional position of the object, and the second unit is functionally incorporated in an engine control apparatus in which the calculated rotation angle of the crankshaft, which serves as the calculated motional position of the object, is used for controlling operations of the engine.

10. A device detecting a motional position of an object in motion, comprising:

a first unit (i) repeatedly producing positional information indicative of the motional position of the object in response to a change in the motional position of the object, the change reflecting therein a motion of the object and the positional information being pulsed information, and (ii) repeatedly transmitting the produced absolute positional information every time when the change in the motional position of the object reaches a given unit quantity of the change; and a second unit (i) repeatedly receiving the positional information transmitted from the first unit and (ii) repeatedly calculating the motional position of the object based on a predetermined procedure including repeatedly counting a starting edge of the positional information to be received, wherein the first unit is configured to produce the positional information serving as absolute positional information indicative of the motion of the object, the positional information is composed of a given-length string of data, and the second unit includes means for calculating, when completing reception of the current positional information, an absolute motional position of the object using the currently reception-completed positional information before the starting edge of the positional information to be received next.

11. A device detecting a motional position of an object in motion, said device comprising:

means for repeatedly producing absolute positional information indicative of the motional position of the object in response to a change in the motional position of the object, the change reflecting therein a motion of the object and the positional information being pulsed information;

means for repeatedly transmitting, through a communication line, the produced absolute positional information every time when the change in the motional position of the object reaches a given unit quantity of the change;

means for repeatedly receiving, through the communication line, the absolute positional information transmitted from the transmitting means; and means for repeatedly calculating the motional position of the object based on a predetermined procedure including repeatedly counting a starting edge of the absolute positional information to be received; and means for correcting the calculated motional position of the object on the basis of the absolute positional information.

12. The device according to claim 11, further comprising a positional sensor placed to sense the change in the motional position of the object, the positional sensor being composed of a magnetic sensor equipped with a magnetism sensing element which senses, as an absolute value, the change in the motional position of the object through a conversion of a magnetic change, which is caused by the motion of the object, into a linear motional characteristic.

13. A method of detecting a motional position of an object in motion, said method comprising:

producing absolute positional information indicative of the motional position of the object in response to a change in the motional position of the object, the change reflecting therein a motion of the object and the positional information being pulsed information;

transmitting, through a communication line, the produced absolute positional information every time when the change in the motional position of the object reaches a given unit quantity of the change;

receiving the absolute positional information transmitted through the communication line; and calculating the motional position of the object based on a predetermined procedure including repeatedly counting a starting edge of the absolute positional information to be received; and correcting the calculated motional position of the object on the basis of the absolute positional information.

14. A device detecting a motional position of an object in motion, said device comprising:

a first unit (i) repeatedly producing positional information indicative of the motional position of the object in response to a change in the motional position of the object, the change reflecting therein a motion of the object and the positional information being pulsed information, and (ii) repeatedly transmitting the produced absolute positional information in a serial communication manner in synchronism with a clock signal every time when the change in the motional position of the object reaches a given unit quantity of the change; and a second unit (i) repeatedly receiving the positional information transmitted from the first unit, (ii) detecting a starting edge of the positional information in response to a first edge of the clock signal to be received in synchronism of each bit of positional information, and (iii) repeatedly calculating the motional position of the object based on a predetermined procedure including repeatedly counting the starting edge of the positional information to be received.

15. The device according to claim 14, wherein:
the first unit is configured to segmentalize the given unit quantity of the change in the motional position of the object such that the lower a motion speed of the object, the more finely segmentalized the given unit quantity.

16. The device according to claim 15, wherein:
the first unit is configured to produce the positional information using the given unit quantity as resolution and to add, to the produced positional information, information indicative of the given unit quantity serving as the information indicative of the resolution, the produced positional information to which the information indicative of the given unit quantity is added being transmitted to the second unit.

17. The device according to claim 14, wherein:
the first unit includes:
means for detecting, after the production of the positional information, a motional stop of the object in response to a state where there is no positional change corresponding to the given unit quantity when a first period of time elapses and means for issuing a command to change the transmission from a position synchronizing communication in synchronism with the positional changes of the object to the time synchronizing communication in synchronism with time during a period of time from the detection of the motional stop of the object to the next detection of the positional change of the object corresponding to the given unit quantity, and the second unit includes stop means for stopping the counting during the time synchronizing communication.

18. The device according to claim 17, wherein:
the second unit includes:
means for determining whether or not the starting edge of the next positional information is detected during a second period of time following the counting of the starting edge of the current positional information, the second period of time being shorter than the first period of time, means for causing the stop means to stop the counting when the determining means determines that the starting edge of the next positional information is not detected during the second period of time, and means for reading the positional information transmitted from the first unit responsively to reception of the positional information when the determining means determines that the starting edge of the next positional information is not detected during the second period of time, and the first unit is configured to transmit, during the time synchronizing communication, the positional information in synchronism with a third period of time longer than the second period of time.

19. The device according to claim 17, wherein:
the first unit is configured to transmit, in response to detecting the motional stop of the object, the calculated positional information to which information showing the motional stop of the object is attached, and the second unit includes:
means for monitoring the received positional information as to whether or not the information showing the motional stop of the object is attached to the positional information, and means for causing the stop means to stop the counting during a period of time during which it is determined that the information showing the motional stop is attached to the positional information.

20. The device according to claim 17, wherein:
the first unit is configured to transmit, in response to detecting the motional stop of the object, the calculated positional information to which information showing the motional stop of the object is attached, and the second unit includes:
means for determining a logical addition condition consisting of a first condition in which the starting edge of the next positional information is not detected during a second period of time following the counting of the starting edge of the current positional information, the second period of time being shorter than the first period of time, and a second condition in which information showing the motional stop of the object is attached to the received positional information, means for causing the stop means to stop the counting depending on a determined result of the determining means, and means for reading the positional information transmitted from the first unit responsively to the reception of the positional information depending on the determined result of the determining means.

21. The device according to claim 14, wherein:
the first unit includes means for modulating the produced positional information into a ternary-modulated signal by using the clock signal, wherein the first unit is adapted to transmit the ternary-modulated signal to the second unit, and the second unit includes means for reading, from the received ternary-modulated signal, the positional information separately from the clock signal.

22. The device according to claim 14, wherein:

the second unit comprises a bit counter counting a string of bits composing the positional information to be received and initializing a count of the bits based on a logical addition condition consisting of a first condition and a second condition, wherein the first condition is an agreement between the count of the bits and the number of bits of information to be transmitted from the first unit and the second condition is that a lack corresponding to two or more clocks occurs in the clock signals before the count equals an amount indicated by the number of bits of the information to be transmitted from the first unit.

23. The device according to claim 14, wherein:

the first unit includes means for pulse-width modulating the produced positional information into a pulse signal depending on the positional information, the pulse signal being transmitted to the second unit, and the second unit includes means for detecting the starting edge of the positional information based on an edge of each pulse signal to be received.

24. The device according to claim 23, wherein:

the pulse-width modulating means is configured to perform the pulse-width modulation so as to allow a pulse width of each of the transmitted pulse signals to agree to a pulse width directly corresponding to the positional information, respectively.

25. The device according to claim 23, wherein:

the pulse-width modulating means is configured to perform the pulse-width modulation so as to allow a pulse width of each of the transmitted pulse signals to agree to a pulse width directly corresponding to positional information belonging to an intermittence period that is set every given change quantity of the produced positional information and to allow a pulse width of the remaining pulse signals to agree to a minimum value of the pulse width.

\* \* \* \* \*